United States Patent
Melli et al.

(10) Patent No.: US 10,442,727 B2
(45) Date of Patent: Oct. 15, 2019

(54) PATTERNING OF HIGH REFRACTIVE INDEX GLASSES BY PLASMA ETCHING

(71) Applicant: Magic Leap, Inc., Plantation, FL (US)

(72) Inventors: Mauro Melli, San Leandro, CA (US); Christophe Peroz, San Francisco, CA (US); Vikramjit Singh, Pflugerville, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/862,078

(22) Filed: Jan. 4, 2018

(65) Prior Publication Data

US 2018/0186689 A1    Jul. 5, 2018

Related U.S. Application Data

(60) Provisional application No. 62/442,809, filed on Jan. 5, 2017.

(51) Int. Cl.
    *C03C 15/00*      (2006.01)
    *F21V 8/00*       (2006.01)
    (Continued)

(52) U.S. Cl.
    CPC ............. *C03C 15/00* (2013.01); *C03C 3/097* (2013.01); *G02B 6/0026* (2013.01);
    (Continued)

(58) Field of Classification Search
None
See application file for complete search history.

(56) References Cited

U.S. PATENT DOCUMENTS

| | | | | |
|---|---|---|---|---|
| 4,773,063 | A | * | 9/1988 | Hunsperger ....... G02B 6/12004 385/130 |
| 5,040,188 | A | * | 8/1991 | Lang ........................ H01S 5/12 372/50.11 |

(Continued)

FOREIGN PATENT DOCUMENTS

WO    WO 2018/129151     7/2018

OTHER PUBLICATIONS

International Invitation to Pay Additional Search Fees for PCT Application No. PCT/US18/12335, dated Mar. 13, 2018.

(Continued)

*Primary Examiner* — Allan W. Olsen
(74) *Attorney, Agent, or Firm* — Knobbe, Martens, Olson & Bear, LLP

(57) ABSTRACT

Plasma etching processes for forming patterns in high refractive index glass substrates, such as for use as waveguides, are provided herein. The substrates may be formed of glass having a refractive index of greater than or equal to about 1.65 and having less than about 50 wt % $SiO_2$. The plasma etching processes may include both chemical and physical etching components. In some embodiments, the plasma etching processes can include forming a patterned mask layer on at least a portion of the high refractive index glass substrate and exposing the mask layer and high refractive index glass substrate to a plasma to remove high refractive index glass from the exposed portions of the substrate. Any remaining mask layer is subsequently removed from the high refractive index glass substrate. The removal of the glass forms a desired patterned structure, such as a diffractive grating, in the high refractive index glass substrate.

28 Claims, 13 Drawing Sheets

(51) Int. Cl.
*G06F 1/16* (2006.01)
*C03C 3/097* (2006.01)
*H04N 5/225* (2006.01)
*G02B 27/22* (2018.01)

(52) U.S. Cl.
CPC ......... *G02B 6/0038* (2013.01); *G02B 6/0076* (2013.01); *G06F 1/163* (2013.01); *C03C 2218/34* (2013.01); *G02B 27/225* (2013.01); *H04N 5/2257* (2013.01)

(56) References Cited

U.S. PATENT DOCUMENTS

| | | | |
|---|---|---|---|
| 5,212,712 A * | 5/1993 | Makuta | H01S 5/12 372/102 |
| 5,932,501 A | 8/1999 | Brocheton | |
| 6,501,868 B1 * | 12/2002 | Kitaoka | G02B 6/126 385/130 |
| 6,850,221 B1 | 2/2005 | Tickle | |
| 7,535,944 B1 * | 5/2009 | Guilfoyle | G02B 6/4214 372/108 |
| 7,627,018 B1 * | 12/2009 | Guilfoyle | G02B 6/4214 372/102 |
| 8,021,561 B1 * | 9/2011 | Qian | B29D 11/00721 216/24 |
| 8,950,867 B2 | 2/2015 | Macnamara | |
| 9,081,426 B2 | 7/2015 | Armstrong | |
| 9,215,293 B2 | 12/2015 | Miller | |
| 9,310,559 B2 | 4/2016 | Macnamara | |
| 9,348,143 B2 | 5/2016 | Gao et al. | |
| D758,367 S | 6/2016 | Natsume | |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| 9,671,566 B2 | 6/2017 | Abovitz et al. | |
| 9,715,067 B1 * | 7/2017 | Brown | G02B 27/0172 |
| 9,740,006 B2 | 8/2017 | Gao | |
| 9,791,700 B2 | 10/2017 | Schowengerdt et al. | |
| 9,851,563 B2 | 12/2017 | Gao et al. | |
| 9,857,591 B2 | 1/2018 | Welch et al. | |
| 9,874,749 B2 | 1/2018 | Bradski et al. | |
| 2002/0071629 A1 * | 6/2002 | Gomes | H04Q 11/0005 385/17 |
| 2002/0097962 A1 * | 7/2002 | Yoshimura | G02B 6/10 385/50 |
| 2003/0133478 A1 * | 7/2003 | Sidorin | H01S 5/141 372/20 |
| 2004/0234222 A1 * | 11/2004 | Kuroda | G02B 6/132 385/129 |
| 2006/0044987 A1 * | 3/2006 | Anderson | G02B 6/0018 369/112.01 |
| 2006/0222032 A1 * | 10/2006 | Sakuma | H01S 5/12 372/50.1 |
| 2009/0053655 A1 | 2/2009 | Deng et al. | |
| 2010/0119229 A1 * | 5/2010 | Roelkens | G02B 6/12007 398/79 |
| 2010/0167091 A1 | 7/2010 | Tachiwana et al. | |
| 2012/0127062 A1 | 5/2012 | Bar-Zeev et al. | |
| 2013/0082922 A1 | 4/2013 | Miller | |
| 2013/0125027 A1 | 5/2013 | Abovitz | |
| 2013/0142998 A1 | 6/2013 | Flemming et al. | |
| 2014/0071539 A1 | 3/2014 | Gao | |
| 2014/0177023 A1 | 6/2014 | Gao et al. | |
| 2014/0191223 A1 | 7/2014 | Wada et al. | |
| 2014/0218468 A1 | 8/2014 | Gao et al. | |
| 2014/0306866 A1 | 10/2014 | Miller et al. | |
| 2015/0103306 A1 | 4/2015 | Kaji et al. | |
| 2015/0125111 A1 * | 5/2015 | Orcutt | G02B 6/122 385/14 |
| 2015/0178939 A1 | 6/2015 | Bradski et al. | |
| 2015/0222883 A1 | 8/2015 | Welch | |
| 2015/0222884 A1 | 8/2015 | Cheng | |
| 2015/0268415 A1 | 9/2015 | Schowengerdt et al. | |
| 2015/0302652 A1 | 10/2015 | Miller et al. | |
| 2015/0309263 A2 | 10/2015 | Abovitz et al. | |
| 2015/0323737 A1 | 11/2015 | Rabiei | |
| 2015/0326570 A1 | 11/2015 | Publicover et al. | |
| 2015/0346490 A1 | 12/2015 | TeKolste et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0149662 A1 * | 5/2016 | Soldano | G02B 6/30 398/51 |
| 2016/0284886 A1 | 9/2016 | Han et al. | |
| 2017/0052384 A1 * | 2/2017 | Santori | G03H 1/0443 |
| 2017/0114246 A1 * | 4/2017 | Arellano | C08F 212/08 |
| 2018/0059304 A1 * | 3/2018 | Bhargava | G02B 6/0035 |

OTHER PUBLICATIONS

International Search Report and Written Opinion for PCT Application No. PCT/US18/12335, dated May 25, 2018.
Bradley et al., "Fabrication of low-loss channel waveguides in Al2O3 and Y2O3 layers by inductively coupled plasma reactive ion etching", Appl Phys B. (2007) 89:311-318.
Choi et al., "The Dry Etching Characteristics of TiO2 Thin Films in N2/CF4/Ar Plasma", Trans Electric Electron Materials (Feb. 24, 2014) 15(1):32-36.
Kim et al., "The Use of Inductively Coupled CF4/Ar Plasma to Improve the Etch Rate of ZrO2 Thin Films", Trans Electric Electron Materials (Feb. 23, 2013) 14(1):12-15.
Kuo et al., "Factors Affecting Reactive Ion Etching of Corning 7059 Glass", SPIE—Monitoring and Control of Plasma-Enhanced Processing of Semiconductors (1988) 10137:103-107.
Lee et al., "Effect of rare-earth elements on the plasma etching behavior of the Re—Si-Al—O glasses", J Non-Cryst Solids. (2012) 358:898-902.
Leech P.W., "Reactive ion etching of quartz and silica-based glasses in CF4/CHF3 plasmas", Vacuum (1999) 55:191-196.
Li et a., "Deep reactive ion etching of Pyrex glass using SF6 plasma", Sensors Actuators A. (2001) 87:139-145.
Sha et al., "Plasma etching selectivity of ZrO2 to Si in BCl3/Cl2 plasmas", J Vac Sci Technol A (Nov./Dec. 2003) 21(6):1915-1922.
Thiénot et al., "Reactive ion etching of glass for biochip applications: Composition effects and surface damages", Microelect Eng. (2006) 83:1155-1158.

\* cited by examiner

PATTERNING OF HIGH REFRACTIVE INDEX GLASSES BY PLASMA ETCHING

PRIORITY CLAIM

This application claims the benefit of priority under 35 U.S.C. § 119(e) of U.S. Provisional Application No. 62/442,809, filed on Jan. 5, 2017, the entire disclosure of which is incorporated herein by reference.

INCORPORATION BY REFERENCE

This application incorporates by reference the entirety of each of the following patent applications: U.S. application Ser. No. 14/555,585 filed on Nov. 27, 2014, published on Jul. 23, 2015 as U.S. Publication No. 2015/0205126; U.S. application Ser. No. 14/690,401 filed on Apr. 18, 2015, published on Oct. 22, 2015 as U.S. Publication No. 2015/0302652; U.S. application Ser. No. 14/212,961 filed on Mar. 14, 2014, now U.S. Pat. No. 9,417,452 issued on Aug. 16, 2016; and U.S. application Ser. No. 14/331,218 filed on Jul. 14, 2014, published on Oct. 29, 2015 as U.S. Publication No. 2015/0309263.

BACKGROUND

Field

The present disclosure relates to display systems and, more particularly, to high resolution patterning of high refractive index glasses for use therein.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 1 is depicted. The user of an AR technology sees a real-world park-like setting 1100 featuring people, trees, buildings in the background, and a concrete platform 1120. The user also perceives that he "sees" "virtual content" such as a robot statue 1110 standing upon the real-world platform 1120, and a flying cartoon-like avatar character 1130 which seems to be a personification of a bumble bee. These elements 1130, 1110 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

Systems and methods disclosed herein address various challenges related to AR and VR technology.

SUMMARY

According to some aspects, methods are disclosed for forming one or more diffractive gratings in a waveguide. In some embodiments, a method may comprise providing a waveguide having a refractive index of greater than or equal to about 1.65. In some embodiments, more than 50 wt % of the waveguide is formed of one or more of $B_2O_3$, $Al_2O_3$, $ZrO_2$, $Li_2O$, $Na_2O$, $K_2O$, MgO, CaO, SrO, BaO, ZnO, $La_2O_3$, $Nb_2O_5$, $TiO_2$, HfO, and $Sb_2O_3$. In some embodiments, the method may further comprise providing a mask layer over the waveguide, the mask layer having a pattern corresponding to the one or more diffractive gratings, the pattern selectively exposing portions of the waveguide, and anisotropically etching the exposed portions of the waveguide to define the one or more diffractive gratings in the waveguide.

In some embodiments, providing a mask layer comprises providing the pattern comprising a first diffraction grating pattern over a first region and a second diffraction grating pattern in the second region of the waveguide, wherein the second region extends over a majority of an area of a surface of the waveguide. In some embodiments, the first diffraction grating pattern corresponds to an incoupling optical element and the second diffraction grating pattern corresponds to an outcoupling optical element. In some embodiments, providing a mask layer comprises providing the pattern comprising a third diffraction grating pattern over a third region of the waveguide, wherein the third diffraction grating pattern corresponds to an orthogonal pupil expander configured to redirect light from the incoupling optical element to the top coupling optical. In some embodiments, the one or more diffractive gratings comprise substantially parallel lines, wherein each line has a critical dimension of less than about 1 micron and an aspect ratio of between about 1:10 to about 10:1. In some embodiments, each line has a critical dimension of less than about 300 nm.

According to some aspects plasma etching processes for forming features in a high refractive index glass substrate are provided. In some embodiments, the process may comprise providing a patterned mask layer on at least a portion of the high refractive index glass substrate, the substrate formed of glass having a refractive index of greater than or equal to about 1.65 and comprising less than about 50 wt % $SiO_2$, and etching the features in the substrate by exposing the mask layer and high refractive index glass substrate to a plasma etch comprising chemical and physical etchant species to selectively remove exposed high refractive index glass from the high refractive index glass substrate.

In some embodiments, the high refractive index glass substrate comprises less than about 30 wt % $SiO_2$. In some embodiments, more than 50 wt % of the high refractive index glass substrate is formed of one or more of $B_2O_3$, $Al_2O_3$, $ZrO_2$, $Li_2O$, $Na_2O$, $K_2O$, MgO, CaO, SrO, BaO, ZnO, $La_2O_3$, $Nb_2O_5$, $TiO_2$, HfO, and $Sb_2O_3$. In some embodiments, the high refractive index glass substrate has a refractive index of greater than or equal to about 1.70. In some embodiments, exposing the mask layer and high refractive index glass substrate to a plasma etch comprises anisotropically removing high refractive index glass from an exposed surface of the high refractive index glass substrate.

In some embodiments, the plasma is generated in situ in a reaction chamber accommodating the high refractive index glass substrate. In some embodiments, the source gas comprises $SF_6$ and Ar gas. In some embodiments, the source gas comprises $BCl_3$, HBr, and Ar gas. In some embodiments, the source gas comprises $CF_4$, $CHF_3$, and Ar gas. In some embodiments, the reaction chamber is the reaction chamber of an inductively coupled plasma (ICP) reactor. In some embodiments, the reaction chamber is the reaction chamber of a dual frequency ICP reactor. In some embodiments, each of the features has a critical dimension of less than about 100 nm. In some embodiments, each of the features has an aspect ratio of between about 1:10 to about 10:1. In some embodiments, the features are sized and spaced to form a diffractive grating. In some embodiments, the mask layer comprises a polymeric resist layer. In some embodiments, the process may further comprise removing remaining mask layer from the high refractive index glass substrate after exposing the mask layer and high refractive index glass substrate to the plasma.

According to some aspects, processes for forming features in a high refractive index glass substrate are provided. In some embodiments, the process may comprise selectively exposing a portion of the high refractive index glass substrate to a plasma in a reaction chamber to selectively remove high refractive index glass from the high refractive index glass substrate, wherein the high refractive index glass substrate comprises less than about 50 wt % $SiO_2$ and has a refractive index of greater than or equal to about 1.65.

In some embodiments, high refractive index glass substrate comprises one or more of $B_2O_3$, $Al_2O_3$, $ZrO_2$, $Li_2O$, $Na_2O$, $K_2O$, MgO, CaO, SrO, BaO, ZnO, $La_2O_3$, $Nb_2O_5$, $TiO_2$, HfO, and $Sb_2O_3$. In some embodiments, selectively exposing a portion of the high refractive index glass substrate defines a pattern of protrusions in the substrate, wherein the protrusions form an optical diffraction grating. In some embodiments, the process may further comprise depositing a mask layer on the substrate, patterning the mask layer to define a first set of spaced apart lines in a first region over the substrate, and a second set of spaced part lines in a second region over the substrate, wherein selectively exposing a portion of the high refractive index glass substrate comprises etching the substrate through the mask layer to form a light incoupling diffractive grating in an area of the substrate corresponding to the first region, and a light outcoupling diffractive grating in an area of the substrate corresponding to the second region. In some embodiments, patterning the mask layer further defines a third set of spaced apart lines in a third region over the substrate, and wherein selectively exposing a portion of the high refractive index glass substrate comprises etching the substrate through the mask layer to form an orthogonal pupil expander corresponding to the third region.

According to some other aspects, methods for forming an optical waveguide structure are provided. The methods comprise identifying desired dimensional characteristics of first features to be formed in a high-index glass substrate and identifying etching characteristics of an etching process that is used for forming at least the first features in the high-index glass substrate. Based on the identified etching characteristics, biased dimensional characteristics are determined for second features of a patterned layer that are to be formed on the high-index glass substrate prior to forming the first features in the high-index glass substrate. The patterned layer is formed on the high-index glass substrate. Forming the patterned layer includes forming the second features in the patterned layered, the second features having the biased dimensional characteristics. The methods also comprise transferring, using the etching process, a pattern of the second features, having the biased dimensional characteristics, into the high-index glass to form the first features, having the desired dimensional characteristics in the high-index glass substrate.

According to yet other aspects, methods are provided for patterning a glass substrate. The methods comprise providing an etch mask over a glass substrate formed of glass having a refractive index of 1.65 or greater. Features in the etch mask for defining corresponding features in the glass substrate are larger than a desired size of the corresponding features. The methods also comprise etching the glass substrate through the etch mask to define the features in the glass substrate.

Figure 1:
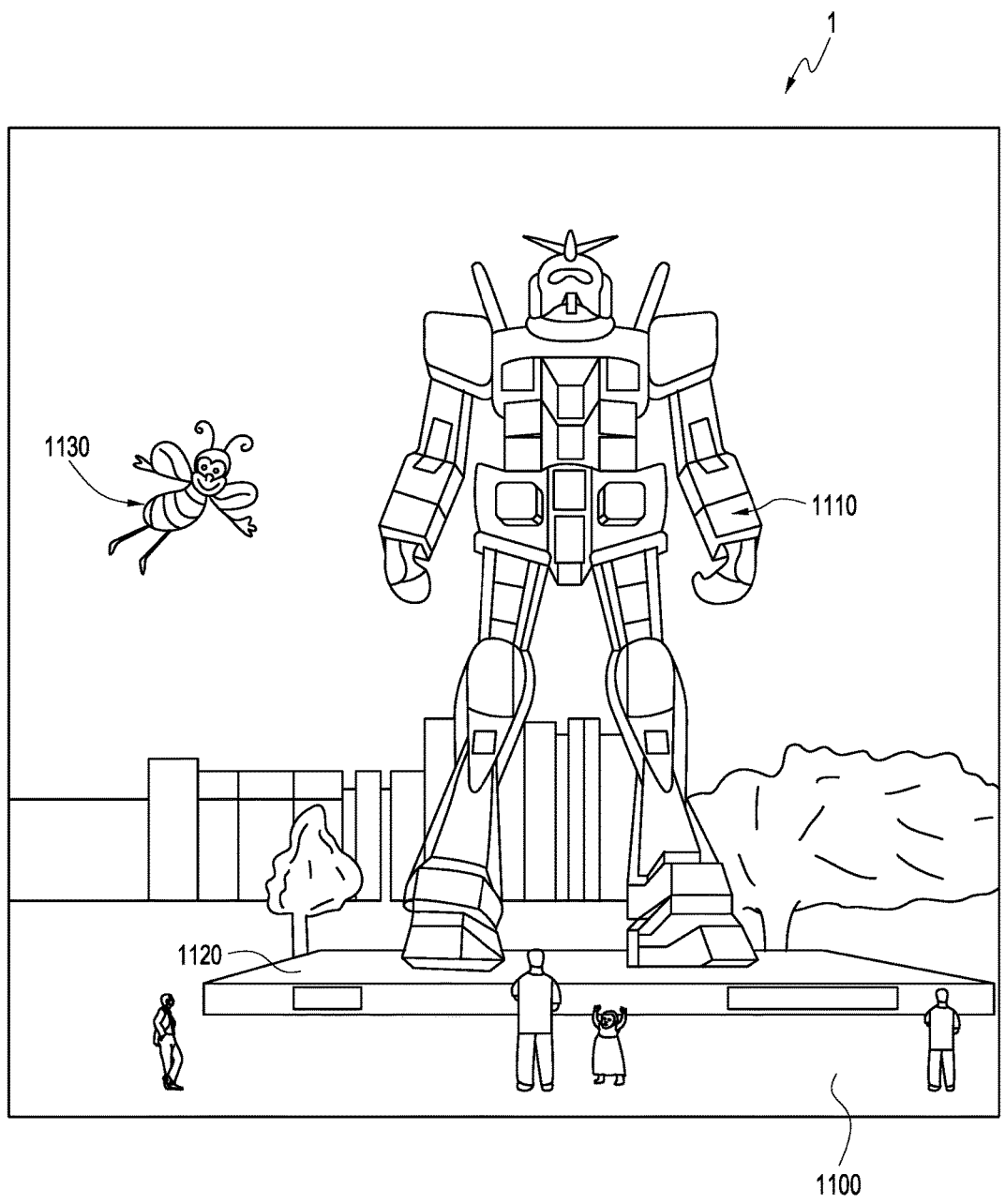
FIG. 1 illustrates a user's view of augmented reality (AR) through an AR device.

The drawings are provided to illustrate example embodiments described herein and are not intended to limit the scope of the disclosure. The drawings are not necessarily drawn to scale.

DETAILED DESCRIPTION

VR and AR display systems may utilize high refractive index glass substrates as waveguides for providing image information in the form of light to a user. The high refractive index of the substrates provides desirable optical properties, including allowing the output of light from the substrate at a wide range of angles and facilitating total internal reflection (TIR) of light within that substrate. It will be appreciated that optical elements may be provided on the surface of the substrate to, e.g., incouple light for TIR within the substrate and/or outcouple light to the user. As an example, these optical elements may take the form of diffractive gratings.

It is difficult, however, to etch optical elements such as diffractive gratings directly in the body of high refractive index glass substrates. Substrate materials having a high refractive index are challenging to etch, particularly at the dimensions desired for optical elements, due to the low amounts of silicon oxide in the substrates. The optical properties of the optical elements, however, are highly dependent upon the regularity, dimensions, and shapes of the elements. It has been found that typical wet chemical etching or reactive ion etching have insufficiently high resolution and/or do not form features with sufficiently vertical or straight sidewalls and/or sufficient aspect ratios for use as optical diffractive gratings.

Consequently, a conventional approach for forming such optical elements is to deposit material for forming optical elements on the substrates. For example, the material may be vapor deposited and patterned. As another example, the optical elements may be formed in a separate film that is attached to the substrate. Such deposition or attachment, however, may undesirably add manufacturing complications and may also introduce optical artifacts. For example, the interfaces between the substrate and the deposited layer or film, and any adhesive layers joining the film to the substrate, may cause reflections that in turn cause optical artifacts.

According to some embodiments, an etching process allows features to be formed directly in the body of a high refractive index glass substrate, while providing high resolution and selectivity. In some embodiments, the etching process is a plasma etching process that comprises forming a patterned mask layer on at least a portion of the surface of the high refractive index glass substrate, and exposing the mask layer and high refractive index glass substrate to a plasma in a reaction chamber to remove a desired amount of high refractive index glass from the exposed portions of the surface of the substrate. The removal leaves features or structures having a desired pattern. The features may form, for example, optical elements such as diffractive gratings, on the surface of the high refractive index glass substrate. In some embodiments, any remaining mask layer of material may be removed from the surface of the substrate.

Preferably, the high refractive index glass substrate has a refractive index of about 1.65 or more or 1.75 or more, and less than about 50 wt % $SiO_2$. In some embodiments, more than 50 wt % of the substrate is formed of one or more of $B_2O_3$, $Al_2O_3$, $ZrO_2$, $Li_2O$, $Na_2O$, $K_2O$, MgO, CaO, SrO, BaO, ZnO, $La_2O_3$, $Nb_2O_5$, $TiO_2$, HfO, and $Sb_2O_3$. In some embodiments, the plasma etch is performed using a very high frequency (VHF) inductively coupled plasma (ICP). In some embodiments, the VHF power is in a range of 10]-2500 W and RF power is in a range of 10-500 W. Preferably, the etching process includes both chemical and physical etching components. In some embodiments, the etch chemistry includes one or more halogen-containing compounds and one or more inert gases. Examples of halogen-containing compounds include $CF_4$, $CHF_3$, $SF_6$, $O_2$, $Cl_2$, $BCl_3$, and HBr and examples of inert gases include Ar, He, and $N_2$. The plasma may be performed at a temperature in the range of −150-50° C.

In some embodiments, features having critical dimensions of about 10-500 nm, including about 10-100 nm, may be etched in the high refractive index glass substrates and may have aspect ratios in the range of about 1:10 to about 10:1.

In addition, the etched features may have substantially straight sidewalls. In some embodiments, these features may be utilized in a variety of applications, such as in optical applications, including as waveguides for VR and AR display systems. For example, the etched features may form incoupling optical elements, outcoupling optical elements, or light distribution elements. In some embodiments, the plasma etching processes may be utilized to etch an arbitrary desired patterned into a high refractive index glass substrate for other applications where high resolution patterning is desired.

Advantageously, plasma etching processes according to some embodiments allow high resolution patterning and etching of high refractive index glass substrates to form features directly in the body of the substrates. The ability to directly etch the substrates may simplify the manufacturer of devices utilizing such features by obviating the need to separately form and attach films containing the features to the substrate. In some embodiments, optical performance may be improved by eliminating the presence of interfaces formed by the separately attach films.

In some embodiments, the etch mask used for patterning the underlying high refractive index glass substrate may be biased with etch mask features having dimensional characteristics that compensate for the characteristics of the etch used to etch the pattern into the substrate. For example, the sizes of features in the etch mask may be larger (e.g., wider and/or taller) than the desired sizes of features to be etched into the substrate, thereby compensating for etching of the etch mask itself over the course of etching the substrate such that, even with etching of the mask itself, the features formed in the substrate are of a desired size. In some embodiments, features in the etch mask may be patterned with sizes larger than the desired sizes of features in the substrate. In some other embodiments, the sizes of the features in the etch mask may be increased by depositing a layer of material to augment those features and/or by chemically reacting those features to increase their sizes. In some embodiments, the substrate may be patterned through the etch mask using a plasma-based etch as disclosed herein. In some other embodiments, the substrate may be patterned using ion beam milling. Advantageously, the biased etch mask facilitates the rapid patterning of high refractive index glass substrates while precisely forming features of desired dimensions.

Reference will now be made to the drawings, in which like reference numerals refer to like features throughout.

Example Display Systems

Figure 2:
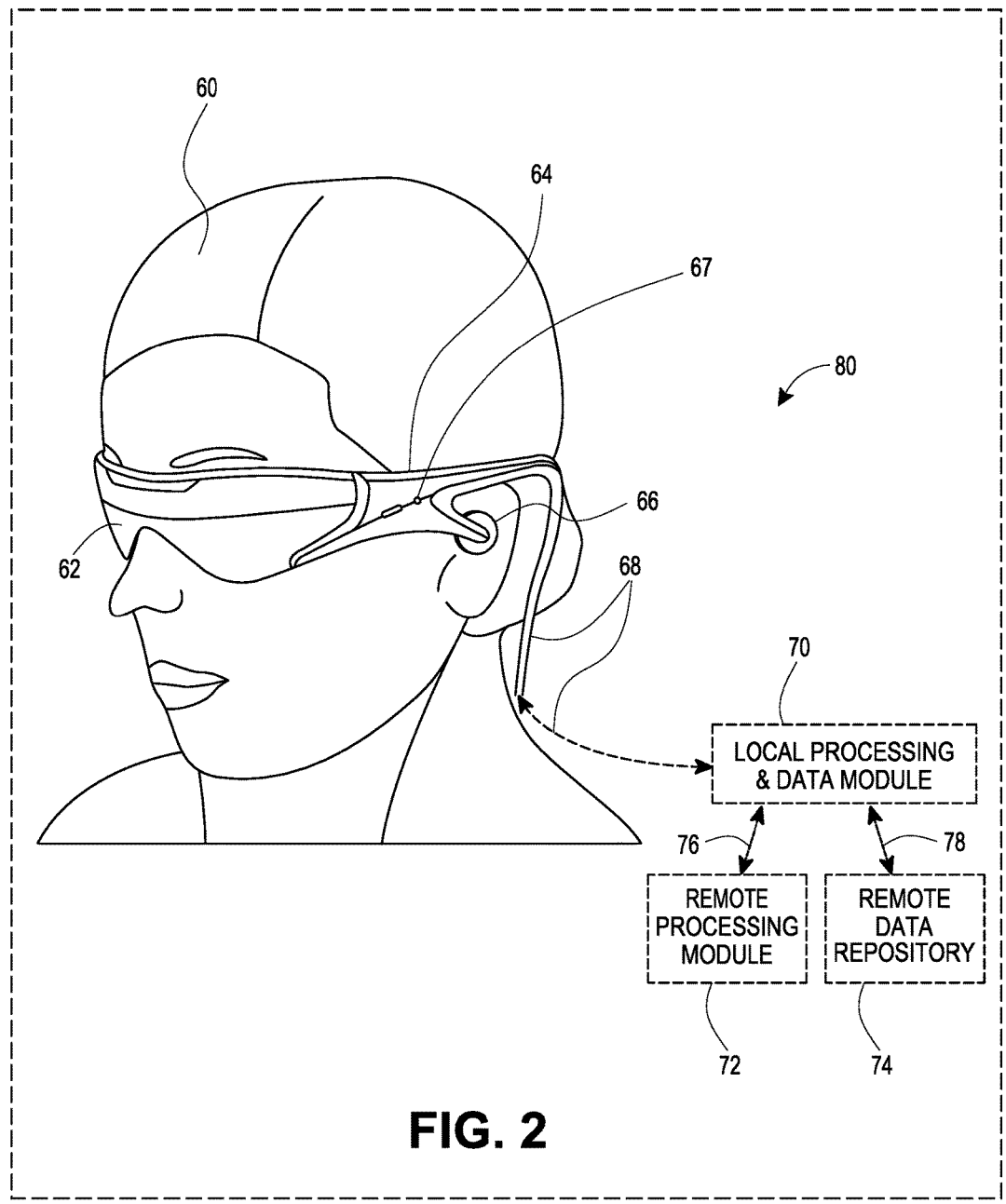
FIG. 2 illustrates an example of wearable display system.

FIG. 2 illustrates an example of wearable display system 80 into which the etched high refractive index glass substrates may be incorporated. The display system 80 includes a display 62, and various mechanical and electronic modules and systems to support the functioning of that display 62. The display 62 may be coupled to a frame 64, which is wearable by a display system user or viewer 60 and which is configured to position the display 62 in front of the eyes of the user 60. The display 62 may be considered eyewear in some embodiments. In some embodiments, a speaker 66 is coupled to the frame 64 and positioned adjacent the ear canal of the user 60 (another speaker, not shown, may optionally be positioned adjacent the other ear canal of the user to provide for stereo/shapeable sound control). The display system may also include one or more microphones 67 or other devices to detect sound. In some embodiments, the microphone is configured to allow the user to provide inputs or commands to the system 80 (e.g., the selection of voice menu commands, natural language questions, etc.)

and/or may allow audio communication with other persons (e.g., with other users of similar display systems).

With continued reference to FIG. 2, the display 62 is operatively coupled by communications link 68, such as by a wired lead or wireless connectivity, to a local data processing module 70 which may be mounted in a variety of configurations, such as fixedly attached to the frame 64, fixedly attached to a helmet or hat worn by the user, embedded in headphones, or otherwise removably attached to the user 60 (e.g., in a backpack-style configuration, in a belt-coupling style configuration). The local processing and data module 70 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 64 or otherwise attached to the user 60), such as image capture devices (such as cameras), microphones, inertial measurement units, accelerometers, compasses, GPS units, radio devices, gyros, and/or other sensors disclosed herein; and/or b) acquired and/or processed using remote processing module 72 and/or remote data repository 74 (including data relating to virtual content), possibly for passage to the display 62 after such processing or retrieval. The local processing and data module 70 may be operatively coupled by communication links 76, 78, such as via a wired or wireless communication links, to the remote processing module 72 and remote data repository 74 such that these remote modules 72, 74 are operatively coupled to each other and available as resources to the local processing and data module 70. In some embodiments, the local processing and data module 70 may include one or more of the image capture devices, microphones, inertial measurement units, accelerometers, compasses, GPS units, radio devices, and/or gyros. In some other embodiments, one or more of these sensors may be attached to the frame 64, or may be standalone structures that communicate with the local processing and data module 70 by wired or wireless communication pathways.

With continued reference to FIG. 2, in some embodiments, the remote processing module 72 may comprise one or more processors configured to analyze and process data and/or image information. In some embodiments, the remote data repository 74 may comprise a digital data storage facility, which may be available through the internet or other networking configuration in a "cloud" resource configuration. In some embodiments, the remote data repository 74 may include one or more remote servers, which provide information, e.g., information for generating augmented reality content, to the local processing and data module 70 and/or the remote processing module 72. In some embodiments, all data is stored and all computations are performed in the local processing and data module, allowing fully autonomous use from a remote module.

Figure 3:
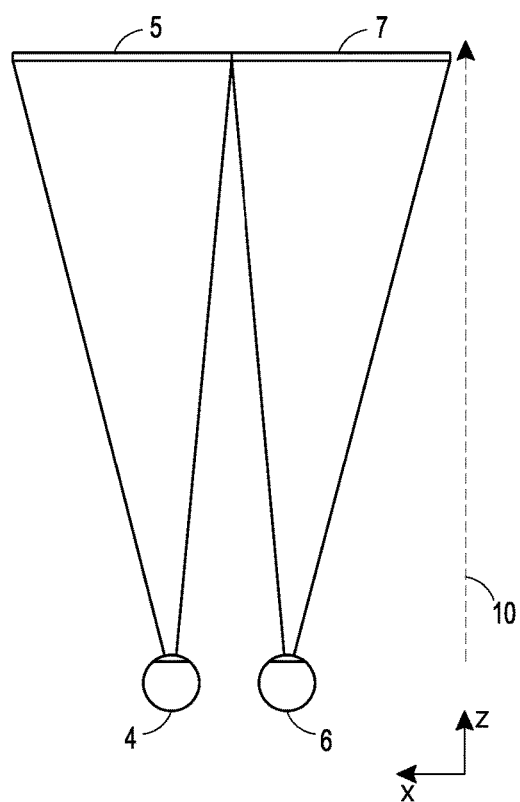
FIG. 3 illustrates a conventional display system for simulating three-dimensional imagery for a user.

With reference now to FIG. 3, the perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 5, 7—one for each eye 4, 6—are outputted to the user. The images 5, 7 are spaced from the eyes 4, 6 by a distance 10 along an optical or z-axis parallel to the line of sight of the viewer. The images 5, 7 are flat and the eyes 4, 6 may focus on the images by assuming a single accommodated state. Such systems rely on the human visual system to combine the images 5, 7 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide a different presentations of a scene, but with the eyes viewing all the image information at a single accommodated state, and work against the "accommodation-vergence reflex." Display systems that provide a better match between accommodation and vergence may form more realistic and comfortable simulations of three-dimensional imagery.

Figure 4:
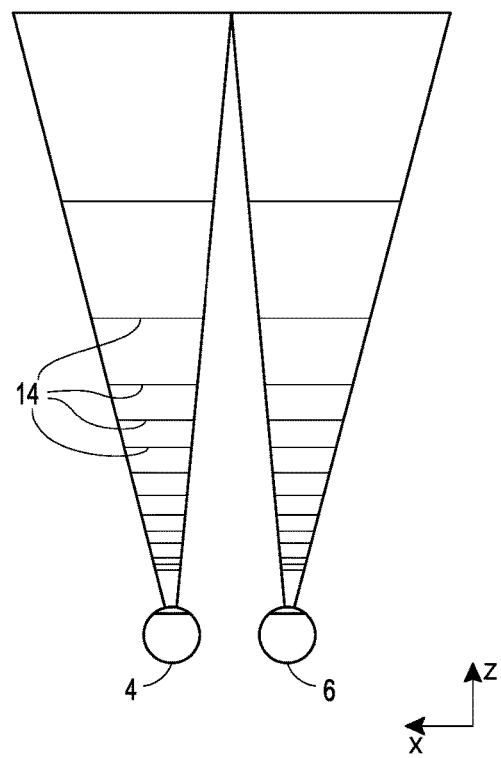
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 4, 6 on the z-axis are accommodated by the eyes 4, 6 so that those objects are in focus. The eyes (4 and 6) assume particular accommodated states to bring into focus objects at different distances along the z-axis. Consequently, a particular accommodated state may be said to be associated with a particular one of depth planes 14, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 4, 6, and also by providing different presentations of the image corresponding to each of the depth planes. While shown as being separate for clarity of illustration, it will be appreciated that the fields of view of the eyes 4, 6 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
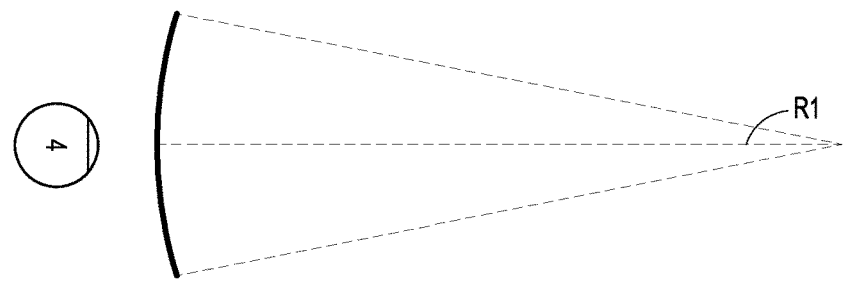
FIGS. 5A-5C illustrate relationships between radius of curvature and focal radius.
Figure 5B:
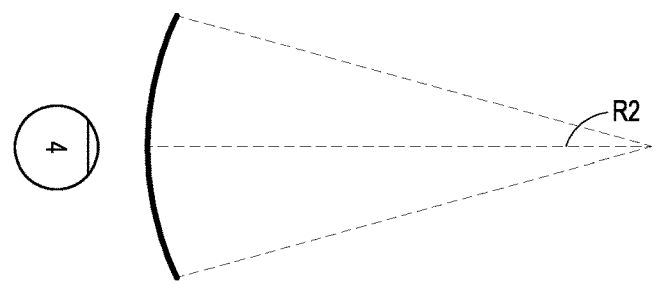
Figure 5C:
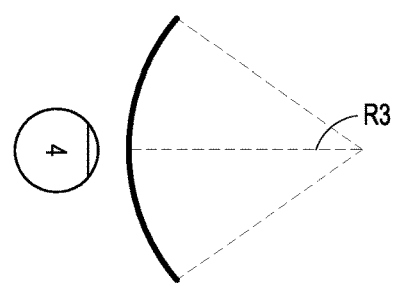

The distance between an object and the eye 4 or 6 may also change the amount of divergence of light from that object, as viewed by that eye. FIGS. 5A-5C illustrates relationships between distance and the divergence of light rays. The distance between the object and the eye 4 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 4. Consequently, at different depth planes, the degree of divergence of light rays is also different, with the degree of divergence increasing with decreasing distance between depth planes and the viewer's eye 4. While only a single eye 4 is illustrated for clarity of illustration in FIGS. 5A-5C and other figures herein, it will be appreciated that the discussions regarding eye 4 may be applied to both eyes 4 and 6 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
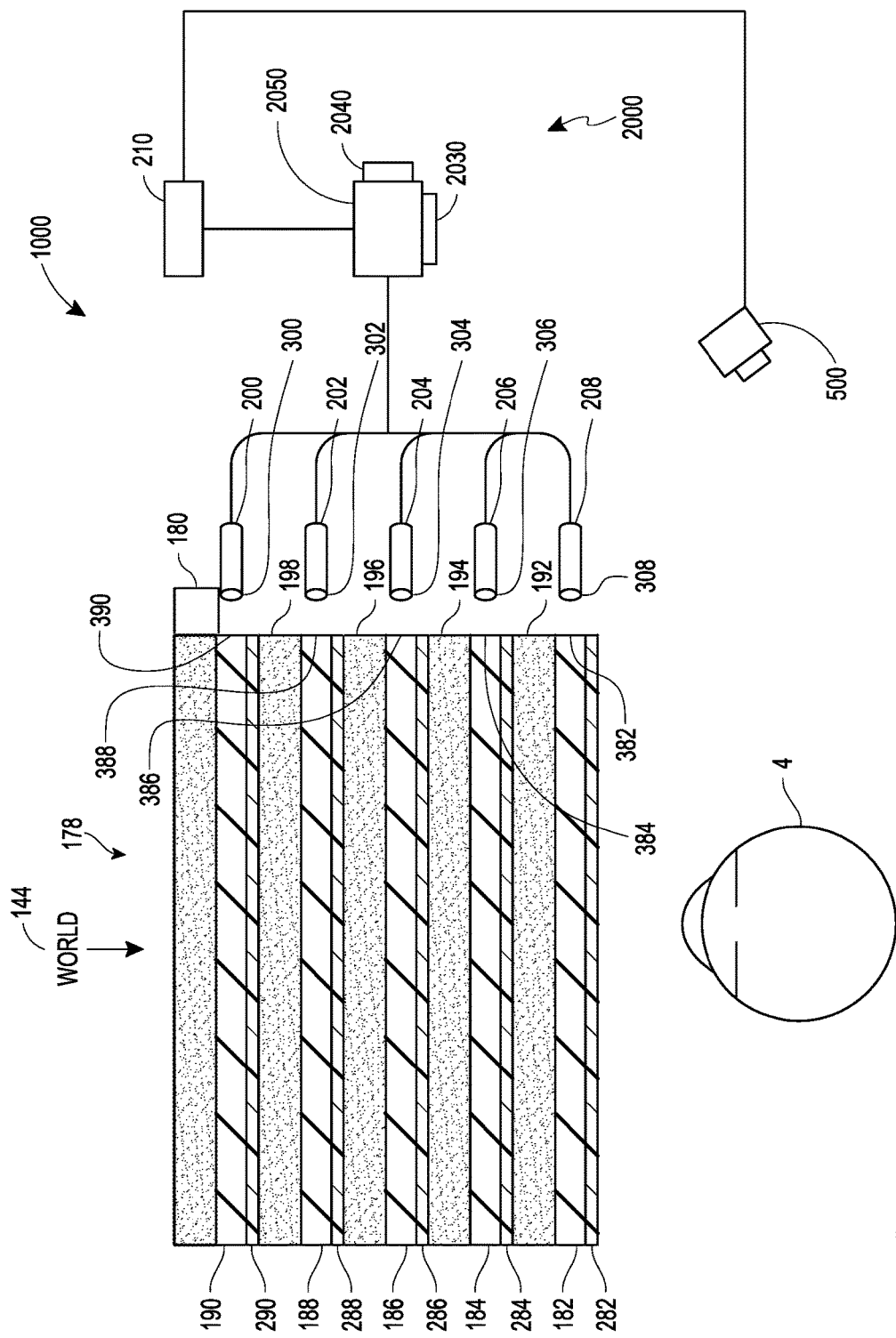
FIG. 6 illustrates an example of a waveguide stack for outputting image information to a user.

FIG. 6 illustrates an example of a waveguide stack for outputting image information to a user. A display system 1000 includes a stack of waveguides, or stacked waveguide assembly, 178 that may be utilized to provide three-dimensional perception to the eye/brain using a plurality of waveguides 182, 184, 186, 188, 190. In some embodiments, the display system 1000 is the system 80 of FIG. 2, with FIG. 6 schematically showing some parts of that system 80 in greater detail. For example, the waveguide assembly 178 may be part of the display 62 of FIG. 2. It will be appreciated that the display system 1000 may be considered a light field display in some embodiments.

With continued reference to FIG. 6, the waveguide assembly 178 may also include a plurality of features 198, 196, 194, 192 between the waveguides. In some embodiments, the features 198, 196, 194, 192 may be one or more lenses. The waveguides 182, 184, 186, 188, 190 and/or the plurality of lenses 198, 196, 194, 192 may be configured to send image information to the eye with various levels of wavefront curvature or light ray divergence. Each waveguide level may be associated with a particular depth plane and may be configured to output image information corresponding to that depth plane. Image injection devices 200, 202, 204, 206, 208 may function as a source of light for the waveguides and may be utilized to inject image information into the waveguides 182, 184, 186, 188, 190, each of which may be configured, as described herein, to distribute incoming light across each respective waveguide, for output toward the eye 4. Light exits an output surface 300, 302, 304, 306, 308 of the image injection devices 200, 202, 204, 206, 208 and is injected into a corresponding input surface 382, 384, 386, 388, 390 of the waveguides 182, 184, 186, 188, 190. In some embodiments, the each of the input surfaces 382, 384, 386, 388, 390 may be an edge of a corresponding waveguide, or may be part of a major surface of the corresponding waveguide (that is, one or both of the waveguide surfaces directly facing the world 144 or the viewer's eye 4). In some embodiments, a single beam of light (e.g. a collimated beam) may be injected into each waveguide to output an entire field of cloned collimated beams that are directed toward the eye 4 at particular angles (and amounts of divergence) corresponding to the depth plane associated with a particular waveguide. In some embodiments, a single one of the image injection devices 200, 202, 204, 206, 208 may be associated with and inject light into a plurality (e.g., three) of the waveguides 182, 184, 186, 188, 190.

In some embodiments, the image injection devices 200, 202, 204, 206, 208 are discrete displays that each produce image information for injection into a corresponding waveguide 182, 184, 186, 188, 190, respectively. In some other embodiments, the image injection devices 200, 202, 204, 206, 208 are the output ends of a single multiplexed display which may, e.g., pipe image information via one or more optical conduits (such as fiber optic cables) to each of the image injection devices 200, 202, 204, 206, 208. It will be appreciated that the image information provided by the image injection devices 200, 202, 204, 206, 208 may include light of different wavelengths, or colors (e.g., different component colors, as discussed herein).

In some embodiments, the light injected into the waveguides 182, 184, 186, 188, 190 is provided by a light projector system 2000, which comprises a light module 2040, which may include a light emitter, such as a light emitting diode (LED). The light from the light module 2040 may be directed to and modified by a light modulator 2030, e.g., a spatial light modulator, via a beam splitter 2050. The light modulator 2030 may be configured to change the perceived intensity of the light injected into the waveguides 182, 184, 186, 188, 190. Examples of spatial light modulators include liquid crystal displays (LCD) including a liquid crystal on silicon (LCOS) displays.

In some embodiments, the display system 1000 may be a scanning fiber display comprising one or more scanning fibers configured to project light in various patterns (e.g., raster scan, spiral scan, Lissajous patterns, etc.) into one or more waveguides 182, 184, 186, 188, 190 and ultimately to the eye 4 of the viewer. In some embodiments, the illustrated image injection devices 200, 202, 204, 206, 208 may schematically represent a single scanning fiber or a bundles of scanning fibers configured to inject light into one or a plurality of the waveguides 182, 184, 186, 188, 190. In some other embodiments, the illustrated image injection devices 200, 202, 204, 206, 208 may schematically represent a plurality of scanning fibers or a plurality of bundles of scanning, fibers each of which are configured to inject light into an associated one of the waveguides 182, 184, 186, 188, 190. It will be appreciated that the one or more optical fibers may be configured to transmit light from the light module 2040 to the one or more waveguides 182, 184, 186, 188, 190. It will be appreciated that one or more intervening optical structures may be provided between the scanning fiber, or fibers, and the one or more waveguides 182, 184, 186, 188, 190 to, e.g., redirect light exiting the scanning fiber into the one or more waveguides 182, 184, 186, 188, 190.

A controller 210 controls the operation of one or more of the stacked waveguide assembly 178, including operation of the image injection devices 200, 202, 204, 206, 208, the light source 2040, and the light modulator 2030. In some embodiments, the controller 210 is part of the local data processing module 70. The controller 210 includes programming (e.g., instructions in a non-transitory medium) that regulates the timing and provision of image information to the waveguides 182, 184, 186, 188, 190 according to, e.g., any of the various schemes disclosed herein. In some embodiments, the controller may be a single integral device, or a distributed system connected by wired or wireless communication channels. The controller 210 may be part of the processing modules 70 or 72 (FIG. 1) in some embodiments.

With continued reference to FIG. 6, the waveguides 182, 184, 186, 188, 190 may be configured to propagate light within each respective waveguide by total internal reflection (TIR). The waveguides 182, 184, 186, 188, 190 may each be planar or have another shape (e.g., curved), with major top and bottom surfaces and edges extending between those major top and bottom surfaces. In the illustrated configuration, the waveguides 182, 184, 186, 188, 190 may each include outcoupling optical elements 282, 284, 286, 288, 290 that are configured to extract light out of a waveguide by redirecting the light, propagating within each respective waveguide, out of the waveguide to output image information to the eye 4. Extracted light may also be referred to as outcoupled light and the outcoupling optical elements light may also be referred to light extracting optical elements. An extracted beam of light is outputted by the waveguide at locations at which the light propagating in the waveguide strikes a light extracting optical element. The outcoupling optical elements 282, 284, 286, 288, 290 may, for example, be gratings, including diffractive optical features, as discussed further herein. While illustrated disposed at the bottom major surfaces of the waveguides 182, 184, 186, 188, 190 for ease of description and drawing clarity, in some embodiments, the outcoupling optical elements 282, 284, 286, 288, 290 may be disposed at the top and/or bottom major surfaces, and/or may be disposed directly in the volume of the waveguides 182, 184, 186, 188, 190, as discussed further herein. In some embodiments, the outcoupling optical elements 282, 284, 286, 288, 290 may be formed in a layer of material that is attached to a transparent substrate to form the waveguides 182, 184, 186, 188, 190. In some other embodiments, the waveguides 182, 184, 186, 188, 190 may be a monolithic piece of material and the outcoupling optical elements 282, 284, 286, 288, 290 may be formed on a surface and/or in the interior of that piece of material.

With continued reference to FIG. 6, as discussed herein, each waveguide 182, 184, 186, 188, 190 is configured to output light to form an image corresponding to a particular depth plane. For example, the waveguide 182 nearest the eye may be configured to deliver collimated light, as injected into such waveguide 182, to the eye 4. The collimated light may be representative of the optical infinity focal plane. The next waveguide up 184 may be configured to send out collimated light which passes through the first lens 192 (e.g., a negative lens) before it can reach the eye 4; such first lens 192 may be configured to create a slight convex wavefront curvature so that the eye/brain interprets light coming from that next waveguide up 184 as coming from a first focal plane closer inward toward the eye 4 from optical infinity. Similarly, the third up waveguide 186 passes its output light through both the first 192 and second 194 lenses before reaching the eye 4; the combined optical power of the first 192 and second 194 lenses may be configured to create another incremental amount of wavefront curvature so that the eye/brain interprets light coming from the third waveguide 186 as coming from a second focal plane that is even closer inward toward the person from optical infinity than was light from the next waveguide up 184.

The other waveguide layers 188, 190 and lenses 196, 198 are similarly configured, with the highest waveguide 190 in the stack sending its output through all of the lenses between it and the eye for an aggregate focal power representative of the closest focal plane to the person. To compensate for the stack of lenses 198, 196, 194, 192 when viewing/interpreting light coming from the world 144 on the other side of the stacked waveguide assembly 178, a compensating lens layer 180 may be disposed at the top of the stack to compensate for the aggregate power of the lens stack 198, 196, 194, 192 below. Such a configuration provides as many perceived focal planes as there are available waveguide/lens pairings. Both the outcoupling optical elements of the waveguides and the focusing aspects of the lenses may be static (i.e., not dynamic or electro-active). In some alternative embodiments, either or both may be dynamic using electro-active features.

In some embodiments, two or more of the waveguides 182, 184, 186, 188, 190 may have the same associated depth plane. For example, multiple waveguides 182, 184, 186, 188, 190 may be configured to output images set to the same depth plane, or multiple subsets of the waveguides 182, 184, 186, 188, 190 may be configured to output images set to the same plurality of depth planes, with one set for each depth plane. This can provide advantages for forming a tiled image to provide an expanded field of view at those depth planes.

With continued reference to FIG. 6, the outcoupling optical elements 282, 284, 286, 288, 290 may be configured to both redirect light out of their respective waveguides and to output this light with the appropriate amount of divergence or collimation for a particular depth plane associated with the waveguide. As a result, waveguides having different associated depth planes may have different configurations of outcoupling optical elements 282, 284, 286, 288, 290, which output light with a different amount of divergence depending on the associated depth plane. In some embodiments, the light extracting optical elements 282, 284, 286, 288, 290 may be volumetric or surface features, which may be configured to output light at specific angles. For example, the light extracting optical elements 282, 284, 286, 288, 290 may be volume holograms, surface holograms, and/or diffraction gratings. In some embodiments, the features 198, 196, 194, 192 may not be lenses; rather, they may simply be spacers (e.g., cladding layers and/or structures for forming air gaps).

In some embodiments, the outcoupling optical elements 282, 284, 286, 288, 290 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 4 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 4 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 500 (e.g., a digital camera, including visible light and infrared light cameras) may be provided to capture images of the eye 4 and/or tissue around the eye 4 to, e.g., detect user inputs. As used herein, a camera may be any image capture device. In some embodiments, the camera assembly 500 may include an image capture device and a light source to project light (e.g., infrared light) to the eye, which may then be reflected by the eye and detected by the image capture device. In some embodiments, the camera assembly 500 may be attached to the frame 64 (FIG. 2) and may be in electrical communication with the processing modules 70 and/or 72, which may process image information from the camera assembly 500. In some embodiments, one camera assembly 500 may be utilized for each eye, to separately monitor each eye.

Figure 7:
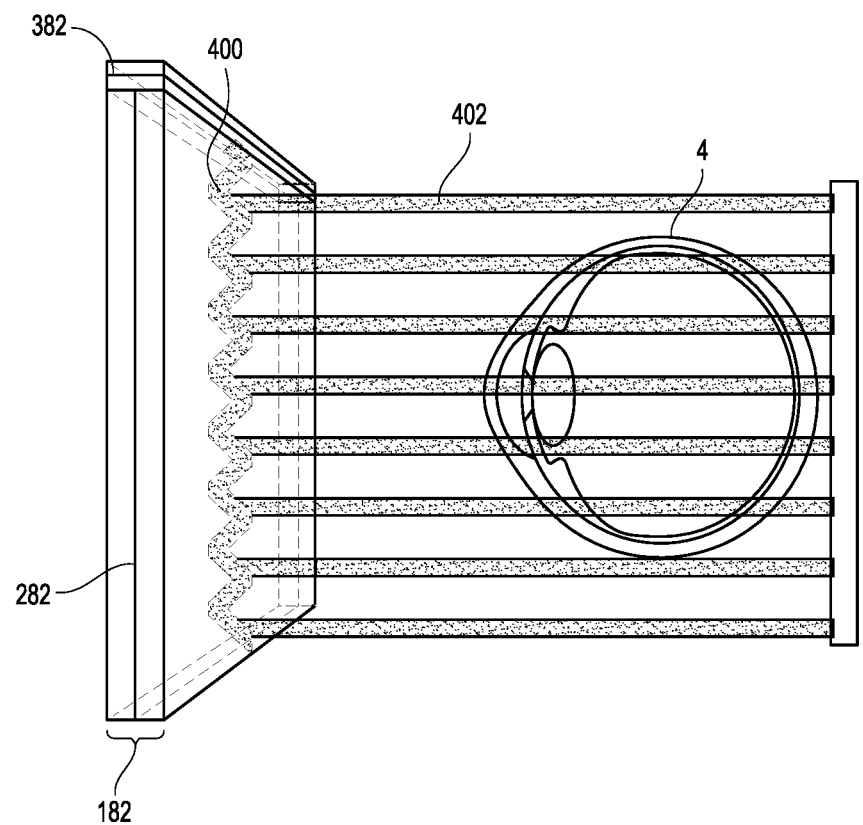
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 178 (FIG. 6) may function similarly, where the waveguide assembly 178 includes multiple waveguides. Light 400 is injected into the waveguide 182 at the input surface 382 of the waveguide 182 and propagates within the waveguide 182 by TIR. At points where the light 400 impinges on the DOE 282, a portion of the light exits the waveguide as exit beams 402. The exit beams 402 are illustrated as substantially parallel but, as discussed herein, they may also be redirected to propagate to the eye 4 at an angle (e.g., forming divergent exit beams), depending on the depth plane associated with the waveguide 182. It will be appreciated that substantially parallel exit beams may be indicative of a waveguide with outcoupling optical elements that outcouple light to form images that appear to be set on a depth plane at a large distance (e.g., optical infinity) from the eye 4. Other waveguides or other sets of outcoupling optical elements may output an exit beam pattern that is more divergent, which would require the eye 4 to accommodate to a closer distance to bring it into focus on the retina and would be interpreted by the brain as light from a distance closer to the eye 4 than optical infinity.

Figure 8:
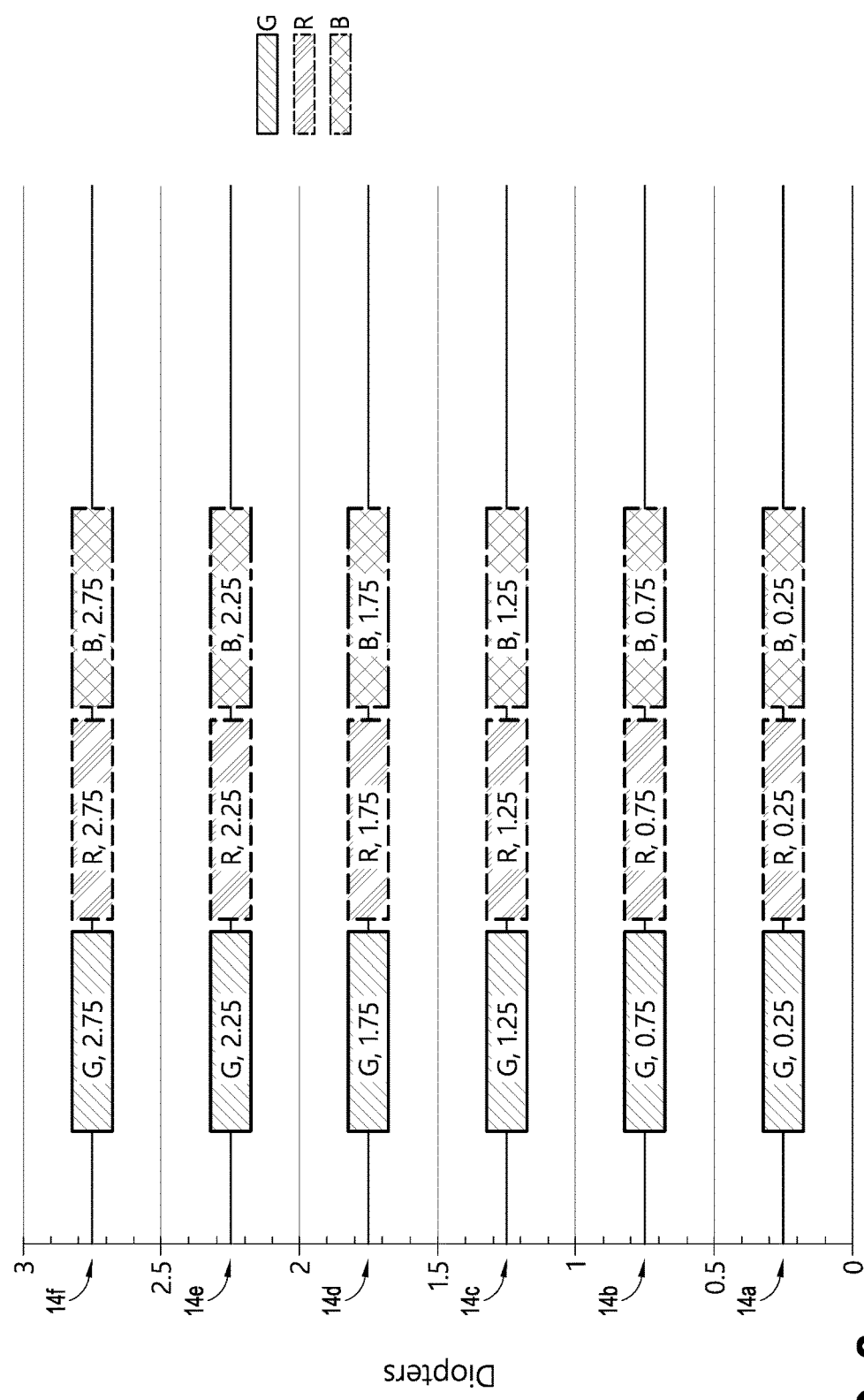
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 14a-14f, although more or fewer depths are also contemplated. Each depth plane may have three component color images associated with it: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

Figure 9A:
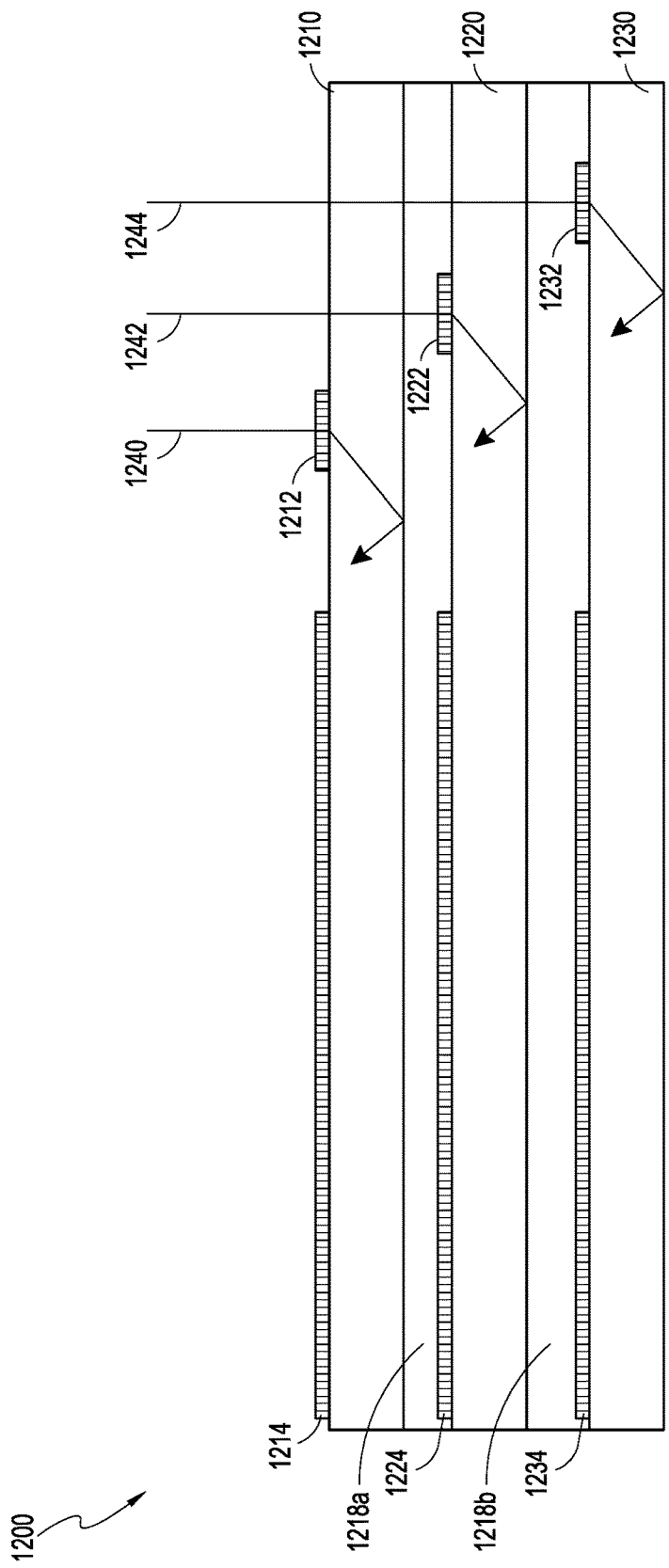
FIG. 9A illustrates a cross-sectional side view of an example of a set of stacked waveguides that each includes an incoupling optical element.

With reference now to FIG. 9A, in some embodiments, light impinging on a waveguide may need to be redirected to incouple that light into the waveguide. An incoupling optical element may be used to redirect and incouple the light into its corresponding waveguide. FIG. 9A illustrates a cross-sectional side view of an example of a plurality or set 1200 of stacked waveguides that each includes an incoupling optical element. The waveguides may each be configured to output light of one or more different wavelengths, or one or more different ranges of wavelengths. It will be appreciated that the stack 1200 may correspond to the stack 178 (FIG. 6) and the illustrated waveguides of the stack 1200 may correspond to part of the plurality of waveguides 182, 184, 186, 188, 190, except that light from one or more of the image injection devices 200, 202, 204, 206, 208 is injected into the waveguides from a position that requires light to be redirected for incoupling.

The illustrated set 1200 of stacked waveguides includes waveguides 1210, 1220, and 1230. Each waveguide includes an associated incoupling optical element (which may also be referred to as a light input area on the waveguide), with, e.g., incoupling optical element 1212 disposed on a major surface (e.g., an upper major surface) of waveguide 1210, incoupling optical element 1222 disposed on a major surface (e.g., an upper major surface) of waveguide 1220, and incoupling optical element 1232 disposed on a major surface (e.g., an upper major surface) of waveguide 1230. In some embodiments, one or more of the incoupling optical elements 1212, 1222, 1232 may be disposed on the bottom major surface of the respective waveguide 1210, 1220, 1230 (particularly where the one or more incoupling optical elements are reflective, deflecting optical elements). As illustrated, the incoupling optical elements 1212, 1222, 1232 may be disposed on the upper major surface of their respective waveguide 1210, 1220, 1230 (or the top of the next lower waveguide), particularly where those incoupling optical elements are transmissive, deflecting optical elements. In some embodiments, the incoupling optical elements 1212, 1222, 1232 may be disposed in the body of the respective waveguide 1210, 1220, 1230. In some embodiments, as discussed herein, the incoupling optical elements 1212, 1222, 1232 are wavelength selective, such that they selectively redirect one or more wavelengths of light, while transmitting other wavelengths of light. While illustrated on one side or corner of their respective waveguide 1210, 1220, 1230, it will be appreciated that the incoupling optical elements 1212, 1222, 1232 may be disposed in other areas of their respective waveguide 1210, 1220, 1230 in some embodiments.

As illustrated, the incoupling optical elements 1212, 1222, 1232 may be laterally offset from one another. In some embodiments, each incoupling optical element may be offset such that it receives light without that light passing through another incoupling optical element. For example, each incoupling optical element 1212, 1222, 1232 may be configured to receive light from a different image injection device 1213, 1223, 1233 and may be separated (e.g., laterally spaced apart) from other incoupling optical elements 1212, 1222, 1232 such that it substantially does not receive light from the other ones of the incoupling optical elements 1212, 1222, 1232.

Each waveguide also includes associated light distributing elements, with, e.g., light distributing elements 1214 disposed on a major surface (e.g., a top major surface) of waveguide 1210, light distributing elements 1224 disposed on a major surface (e.g., a top major surface) of waveguide 1220, and light distributing elements 1234 disposed on a major surface (e.g., a top major surface) of waveguide 1230. In some other embodiments, the light distributing elements 1214, 1224, 1234, may be disposed on a bottom major surface of associated waveguides 1210, 1220, 1230, respectively. In some other embodiments, the light distributing elements 1214, 1224, 1234, may be disposed on both top and bottom major surface of associated waveguides 1210, 1220, 1230, respectively; or the light distributing elements 1214, 1224, 1234, may be disposed on different ones of the top and bottom major surfaces in different associated waveguides 1210, 1220, 1230, respectively.

The waveguides 1210, 1220, 1230 may be spaced apart and separated by, e.g., gas, liquid, and/or solid layers of material. For example, as illustrated, layer 1218a may separate waveguides 1210 and 1220; and layer 1218b may separate waveguides 1220 and 1230. In some embodiments, the layers 1218a and 1218b are formed of low refractive index materials (that is, materials having a lower refractive index than the material forming the immediately adjacent one of waveguides 1210, 1220, 1230). Preferably, the refractive index of the material forming the layers 1218a, 1218b is 0.05 or more, or 0.10 or more less than the refractive index of the material forming the waveguides 1210, 1220, 1230. Advantageously, the lower refractive index layers 1218a, 1218b may function as cladding layers that facilitate total internal reflection (TIR) of light through the waveguides 1210, 1220, 1230 (e.g., TIR between the top and bottom major surfaces of each waveguide). In some embodiments, the layers 1218a, 1218b are formed of air. While not illustrated, it will be appreciated that the top and bottom of the illustrated set 1200 of waveguides may include immediately neighboring cladding layers.

Preferably, for ease of manufacturing and other considerations, the material forming the waveguides 1210, 1220, 1230 are similar or the same, and the material forming the layers 1218a, 1218b are similar or the same. In some embodiments, the material forming the waveguides 1210, 1220, 1230 may be different between one or more waveguides, and/or the material forming the layers 1218a, 1218b may be different, while still holding to the various refractive index relationships noted above.

With continued reference to FIG. 9A, light rays 1240, 1242, 1244 are incident on the set 1200 of waveguides. It will be appreciated that the light rays 1240, 1242, 1244 may be injected into the waveguides 1210, 1220, 1230 by one or more image injection devices 200, 202, 204, 206, 208 (FIG. 6).

In some embodiments, the light rays 1240, 1242, 1244 have different properties, e.g., different wavelengths or different ranges of wavelengths, which may correspond to different colors. The incoupling optical elements 1212, 122, 1232 each deflect the incident light such that the light propagates through a respective one of the waveguides 1210, 1220, 1230 by TIR. In some embodiments, the incoupling optical elements 1212, 122, 1232 each selectively deflect one or more particular wavelengths of light, while transmitting other wavelengths to an underlying waveguide and associated incoupling optical element.

For example, incoupling optical element 1212 may be configured to deflect ray 1240, which has a first wavelength or range of wavelengths, while transmitting rays 1242 and 1244, which have different second and third wavelengths or ranges of wavelengths, respectively. The transmitted ray 1242 then impinges on and is deflected by the incoupling optical element 1222, which is configured to selectively deflect light of second wavelength or range of wavelengths. The ray 1244 is transmitted by the incoupling optical element 1222 and continues on to impinge on and be deflected by the incoupling optical element 1232, which is configured to selectively deflect light of third wavelength or range of wavelengths.

With continued reference to FIG. 9A, the deflected light rays 1240, 1242, 1244 are deflected so that they propagate through a corresponding waveguide 1210, 1220, 1230; that is, the incoupling optical elements 1212, 1222, 1232 of each waveguide deflects light into that corresponding waveguide 1210, 1220, 1230 to incouple light into that corresponding waveguide. The light rays 1240, 1242, 1244 are deflected at angles that cause the light to propagate through the respective waveguide 1210, 1220, 1230 by TIR. The light rays 1240, 1242, 1244 propagate through the respective waveguide 1210, 1220, 1230 by TIR until impinging on the waveguide's corresponding light distributing elements 1214, 1224, 1234.

Figure 9B:
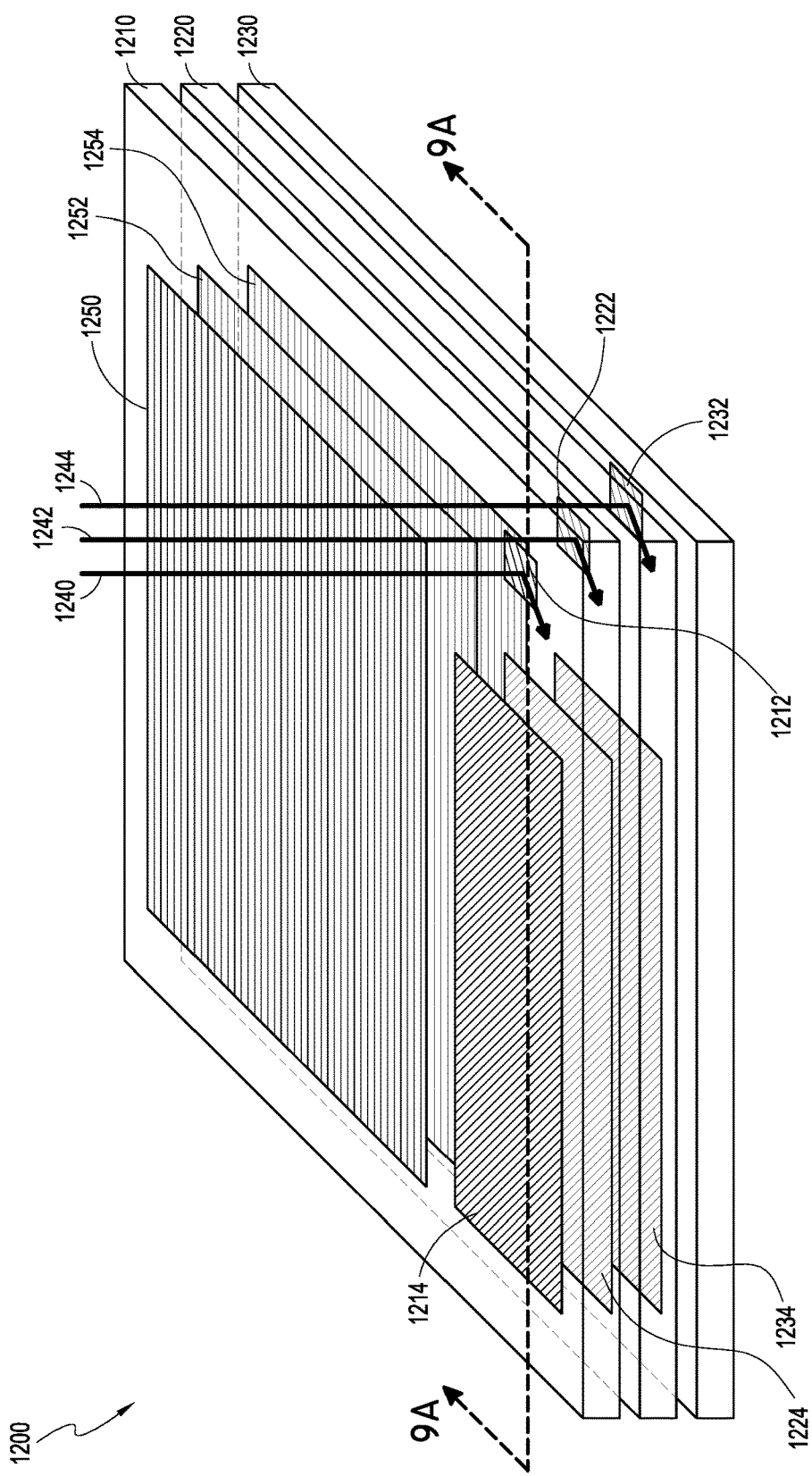
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the incoupled light rays 1240, 1242, 1244, are deflected by the incoupling optical elements 1212, 1222, 1232, respectively, and then propagate by TIR within the waveguides 1210, 1220, 1230, respectively. The light rays 1240, 1242, 1244 then impinge on the light distributing elements 1214, 1224, 1234, respectively. The light distributing elements 1214, 1224, 1234 deflect the light rays 1240, 1242, 1244 so that they propagate towards the outcoupling optical elements 1250, 1252, 1254, respectively.

In some embodiments, the light distributing elements 1214, 1224, 1234 are orthogonal pupil expanders (OPE's). In some embodiments, the OPE's both deflect or distribute light to the outcoupling optical elements 1250, 1252, 1254 and also increase the beam or spot size of this light as it propagates to the outcoupling optical elements. In some embodiments, e.g., where the beam size is already of a desired size, the light distributing elements 1214, 1224, 1234 may be omitted and the incoupling optical elements 1212, 1222, 1232 may be configured to deflect light directly to the outcoupling optical elements 1250, 1252, 1254. For example, with reference to FIG. 9A, the light distributing elements 1214, 1224, 1234 may be replaced with outcoupling optical elements 1250, 1252, 1254, respectively. In some embodiments, the outcoupling optical elements 1250, 1252, 1254 are exit pupils (EP's) or exit pupil expanders (EPE's) that direct light in a viewer's eye 4 (FIG. 7).

Accordingly, with reference to FIGS. 9A and 9B, in some embodiments, the set 1200 of waveguides includes waveguides 1210, 1220, 1230; incoupling optical elements 1212, 1222, 1232; light distributing elements (e.g., OPE's) 1214, 1224, 1234; and outcoupling optical elements (e.g., EP's) 1250, 1252, 1254 for each component color. The waveguides 1210, 1220, 1230 may be stacked with an air gap/cladding layer between each one. The incoupling optical elements 1212, 1222, 1232 redirect or deflect incident light (with different incoupling optical elements receiving light of different wavelengths) into its waveguide. The light then propagates at an angle which will result in TIR within the respective waveguide 1210, 1220, 1230. In the example shown, light ray 1240 (e.g., blue light) is deflected by the first incoupling optical element 1212, and then continues to bounce down the waveguide, interacting with the light distributing element (e.g., OPE's) 1214 and then the outcoupling optical element (e.g., EPs) 1250, in a manner described earlier. The light rays 1242 and 1244 (e.g., green and red light, respectively) will pass through the waveguide 1210, with light ray 1242 impinging on and being deflected by incoupling optical element 1222. The light ray 1242 then bounces down the waveguide 1220 via TIR, proceeding on to its light distributing element (e.g., OPEs) 1224 and then the outcoupling optical element (e.g., EP's) 1252. Finally, light ray 1244 (e.g., red light) passes through the waveguide 1220 to impinge on the light incoupling optical elements 1232 of the waveguide 1230. The light incoupling optical elements 1232 deflect the light ray 1244 such that the light ray propagates to light distributing element (e.g., OPEs) 1234 by TIR, and then to the outcoupling optical element (e.g., EPs) 1254 by TIR. The outcoupling optical element 1254 then finally outcouples the light ray 1244 to the viewer, who also receives the outcoupled light from the other waveguides 1210, 1220.

Figure 9C:
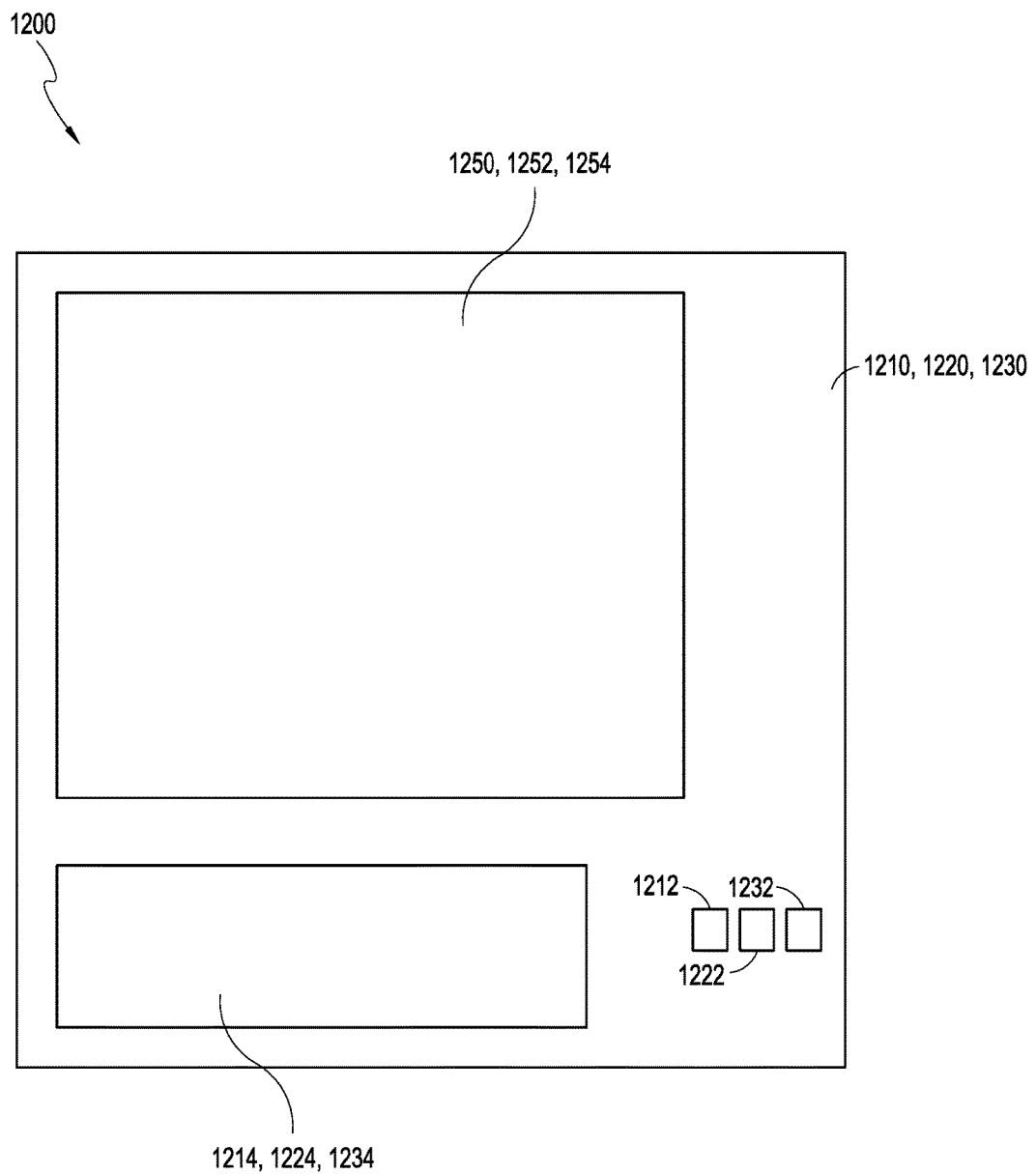
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 1210, 1220, 1230, along with each waveguide's associated light distributing element 1214, 1224, 1234 and associated outcoupling optical element 1250, 1252, 1254, may be vertically aligned. However, as discussed herein, the incoupling optical elements 1212, 1222, 1232 are not vertically aligned; rather, the incoupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated incoupling optical elements may be referred to as a shifted pupil system, and the incoupling optical elements within these arrangements may correspond to sub pupils.

Example Etches for High Refractive Index Glasses

In some embodiments, microscale and nanoscale features, such the various diffractive optical elements discussed herein, may be etched directly in a high refractive index glass substrate. For example, the glass substrate may be used as a waveguide and the plasma etching processes may be used to form the incoupling optical elements 1212, 1222, 1232, the light distributing elements 1214, 1224, 1234, and/or the outcoupling optical element 1250, 1252, 1254 of FIGS. 9A-9C directly in the substrate.

The high refractive index glass forming the substrates may have a relatively low concentration of silicon dioxide ($SiO_2$), e.g., less than 50 weight percent (wt %) $SiO_2$. In addition, these high refractive index glasses may comprise 50 wt % or more of one or more metal oxides, such as $B_2O_3$, $Al_2O_3$, $ZrO_2$, $Li_2O$, $Na_2O$, $K_2O$, MgO, CaO, SrO, BaO, ZnO, $La_2O_3$, $Nb_2O_5$, $TiO_2$, HfO, and $Sb_2O_3$. In some embodiments, the glasses may include combinations of these metal oxides.

While providing a high refractive index, the low amounts of $SiO_2$ and high amounts of other metal oxides may prevent effective etching of substrates formed using these glasses. For example, glasses formed by such combinations of component oxides may be particularly difficult to etch. Even where specific etching recipes have been developed for a component oxide, these etching recipes may not be effective for high refractive index glasses due to the relatively low concentration of $SiO_2$ and differing etch rates between the constituent component oxides forming a glass.

In addition, conventional etches processes exhibit various deficiencies. For example, wet chemical etching is typically limited to a patterning resolution on the order of microns and is isotropic, which may not form straight sidewalls. Alternatively, ion milling may be used to unselectively remove material from high refractive index glass substrates; however, this process severely limits the attainable resolution and aspect ratios of patterned features. Ion milling may remove material simply by bombarding a surface with high-energy particles that physically sputter away material from that surface. Ion milling requires a hardmask, but also erodes the hardmask, such that the process may be unable to maintain the mask for a sufficient duration to form high aspect ratio features.

According to some embodiments, as discussed herein, a plasma etching process has been developed to form features in a high refractive index glass substrate. The features may be formed by using the plasma etching process to transfer a pattern from a mask layer to the high refractive index glass substrate underlying the mask layer. The plasma etching process may be anisotropic, or directional, and may be highly selective for the glass substrate relative to the mask layer. The features produced as a result of the plasma etching process may have substantially vertical sidewalls. In some embodiments, the plasma etching process may not be selective for all oxides that may form the high refractive index glass substrate. In some embodiments, the plasma etching process may include both chemical and physical mechanisms for etching the high refractive index glass, with the physical mechanisms allowing the removal of oxide species for which the chemical mechanisms may not be highly effective in removing. Without being limited by theory, chemical etching of at least some substrate material may disrupt the physical integrity of the exposed substrate, thereby allowing the physical mechanisms to remove exposed material with higher selectivity than would occur without the chemical etching. Thus, a high resolution pattern may be transferred to the high refractive index glass substrate via the plasma etching process, even where the high refractive index glass comprises a complex mixture of oxides.

In some embodiments, the substrate may be patterned by selectively exposing some areas of the surface of the substrate to reactive species. That is, some areas of the substrate may be etched while other areas may not be etched in order to form features therein. For example, a patterned masking material or mask layer which resists etching may overlay the substrate such that the area under the mask layer is not etched while the area unprotected or left exposed by the mask layer is etched. The mask layer may then be removed to leave the etched features on the surface of the substrate.

As discussed herein, the plasma etching process may be an anisotropic, or substantially anisotropic, etching process. The directionality of the anisotropic etch advantageously allows the formation of substantially straight sidewalls. Where etchant species are directed towards the substrate in a direction perpendicular to the substrate, the etching process may define features in the substrate with substantially vertical sidewalls. In some embodiments, straight, angled (non-vertical) sidewalls may be formed by directing etchant species to the substrate at an angle that is not perpendicular to the substrate.

In some embodiments, the plasma etching process may etch two or more oxides, which comprise a high refractive index glass, at substantially similar rates. In some embodiments, the etch rate may be substantially similar for any two or more of $SiO_2$, $B_2O_3$, $Al_2O_3$, $ZrO_2$, $Li_2O$, $Na_2O$, $K_2O$, $MgO$, $CaO$, $SrO$, $BaO$, $ZnO$, $La_2O_3$, $Nb_2O_5$, $TiO_2$, $HfO$, and $Sb_2O_3$.

It will be appreciated that the term "high refractive index" is used herein to refer to materials, preferably optically transmissive materials such as glasses, that have a refractive index greater than or equal to 1.65. In some embodiments, a high refractive index glass may have a refractive index of 1.65 or greater, 1.7 or greater, 1.75 or greater, or 1.8 or greater. In some embodiments, the refractive index may be as noted above and also less than 4, less than 3, or less than 2.5. In some other embodiments, the etching processes described herein may be applied to etch substrates having a refractive index lower than 1.65.

In some embodiments, the high refractive index glass comprises less than about 50 percent by weight (wt %) $SiO_2$. In some embodiments, the high refractive index glass may comprises less than about 30 wt % $SiO_2$, less than about 25 wt % $SiO_2$, or less than about 20 wt % $SiO_2$. In some embodiments, the remainder of the high refractive index glass may comprise at least one metal oxide, including a plurality of metal oxides; that is, a high refractive index glass may comprise greater than about 50 wt % of one or a plurality of metal oxides such as $B_2O_3$, $Al_2O_3$, $ZrO_2$, $Li_2O$, $Na_2O$, $K_2O$, $MgO$, $CaO$, $SrO$, $BaO$, $ZnO$, $La_2O_3$, $Nb_2O_5$, $TiO_2$, $HfO$, and $Sb_2O_3$. The high refractive index glass may comprise up to about 30 wt % of any one metal oxide in some embodiments.

According to certain embodiments, the high refractive index glass may comprise $SiO_2$, $B_2O_3$, $TiO_2$, $La_2O_3$, $ZrO_2$, $Nb_2O_5$, $CaO$, and $Li_2O$. For example, the high refractive index glass may comprise between about 20 wt % to about 30 wt % $SiO_2$, between about 0 wt % and 5 wt % $B_2O_3$, between about 5 wt % and 10 wt % $TiO_2$, between about 20 wt % and 25 wt % $La_2O_3$, between about 5 wt % and 10 wt % $ZrO_2$, between about 10 wt % and 15 wt % $Nb_2O_5$, between about 15 wt % and 20 wt % $CaO$, and between about 0 wt % and 5 wt % $Li_2O$.

According to some embodiments, the plasma etching process described may be used to form features having a critical dimension within a range from about 10 nm to about 10 μm. As used herein, the critical dimension refers to the minimum dimension of features formed in a substrate, as seen in a top-down view. For example, the critical dimension of a grating formed by identical elongated features is the width of one of the features, as seen in the top-down view. In some embodiments, the critical dimension of a feature formed in a high refractive index glass substrate may be within a range from about 10 nm to about 500 nm, including about 10 nm to about 100 nm, or about 100 nm to about 500 nm. In some embodiments, the features formed by the plasma etching process comprise substantially vertical sidewalls. In some embodiments, an angle formed between a feature formed by the plasma etching process, such as a sidewall, and a horizontal surface of the substrate may be greater than 75°, greater than 80°, or greater than 85°.

In some embodiments, the plasma etching process may form features that have an aspect ratio in a range from about 1:10 to about 10:1, from about 1:10 to about 3:1, or from about 3:1 to about 10:1. It will be appreciated that the aspect ratio is the ratio of the width of a feature and the height of the feature.

Figure 10:
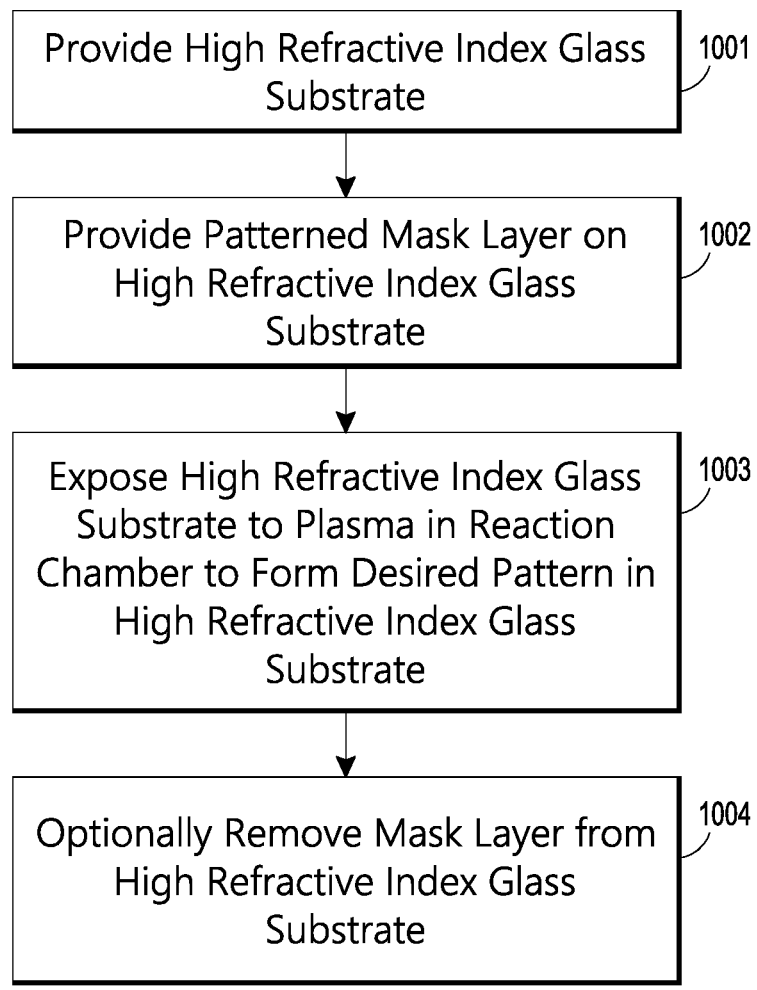
FIG. 10 is a process flow diagram for an example of a plasma etching process according to some embodiments.

Reference will now be made to FIG. 10, which shows a process flow diagram for an example of a plasma etching process according to some embodiments. A substrate comprising a high refractive index glass as described herein is provided at block 1001. A mask layer comprising a pattern of openings is provided on the high refractive index glass substrate at block 1002, such that at least a portion of the high refractive index glass substrate is exposed by the mask layer. In some embodiments, the mask layer may comprise, for example, a polymeric photoresist layer or hardmask having a desired pattern, such as a binary grating pattern. In some embodiments, blocks 1001 and 1002 may be combined. For example, the etch process may start with a high refractive index glass substrate in an etch chamber, with the substrate having an overlying patterned mask layer.

The high refractive index glass substrate and mask layer are exposed to a plasma in a reaction chamber at block 1003 until a desired amount of high refractive index glass has been removed from the portion or portions of the high refractive index glass substrate that are exposed by openings in the mask layer to thereby form the desired pattern in the high refractive index glass substrate. Preferably, as discussed herein, plasma comprises chemical and physical etching species. Any mask layer remaining over the high refractive index glass substrate may be removed at block 1004. Such a removal may be accomplished, for example, by contacting the remaining mask layer with a solvent that dissolves the layer or using an ashing process.

In some embodiments, the mask layer may be patterned at block 1002 by a lithographic technique. For example, the mask layer may be patterned by ultraviolet photolithography, nanoimprinting, e-beam lithography, or other techniques for removing material at selected areas of the mask layer to form openings that expose the underlying glass substrate.

In some embodiments, the mask layer may comprise a polymer, for example a polymeric resist material, e.g., a photoresist material. In some embodiments, the mask layer may be a hardmask layer. In some embodiments, the hardmask layer may comprise a metal such as nickel, or amorphous carbon.

In some embodiments, the mask layer may provide an etch selectivity ratio in a range of about 0.1 to about 10. As used herein, the etch selectivity ratio refers to the ratio of the etch rate of a high refractive index glass substrate relative to the etch rate of the mask layer. In some embodiments, the mask layer may have an etch selectivity ratio of greater than about 0.5, greater than about 1, greater than about 2, or greater than about 5, up to about 10. The thickness of the mask layer may be selected based upon the depth of features to be formed by the subsequent exposure to etchant species. For example, the thickness may be selected to be sufficiently thick, in view of the selectivity provided by the etchant species and the etch conditions, such that the mask layer is not worn away by the subsequent exposure to the etchant species. In some embodiments, the critical dimensions or widths of features in the mask layer also may be sufficiently larger than the desired sizes of substrate features to be patterned using these mass features, to compensate for reductions in width caused by etching with the etchant species. In some embodiments, features in the mask layer may be formed to a sufficiently large size by first patterning the mask layer and then augmenting the sizes of the features by conformally depositing (e.g., by CVD or ALD) an additional layer of mask material over those features. The additional conformal layer of mask material may be formed of the same or a different material than the underlying patterned mask layer.

In some embodiments the patterned mask layer may be on a high refractive index glass substrate. The mask layer may comprise a plurality of substantially parallel lines formed on the surface of the high refractive index glass. In some embodiments, the lines may have thicknesses of about 100 nm and base widths of about 135 nm. It will be appreciated that the mask layer may be patterned to have shapes other than lines. For example, in some embodiments, the mask layer pattern may comprise any pattern, shape, or design, and may have a critical dimension of about 10-500 nm.

In some embodiments, the mask layer pattern may comprise a pattern corresponding to an optical element, such as a diffraction grating or DOE. In some embodiments, the mask layer pattern may comprise a binary diffraction grating. As discussed herein, in some embodiments, the mask layer pattern may comprise an incoupling optical element, an outcoupling optical element, or a light distributing element, for example as shown in FIGS. 9A-9C.

The high refractive index glass substrate having the overlying mask layer may be provided in a plasma etch chamber of a plasma reactor and then exposed to a plasma at block 1003. Providing the substrate in the reaction chamber may include loading the substrate into the reaction chamber. In some embodiments, a plasma may be generated in the reaction chamber, that is, in situ. In some embodiments a plasma may be generated in a second, different chamber upstream of the reaction chamber, such as a remote plasma generator, and provided to the reaction chamber accommodating the high refractive index glass substrate. In some embodiments, the plasma reactor may be an inductively coupled plasma (ICP) reactor. In some embodiments, the plasma reactor may be a dual frequency ICP reactor.

A plasma to which the high refractive index glass substrate and mask layer is exposed at block 1003 may be a plasma generated with a source gas in the plasma reactor. Thus, in some embodiments the plasma may comprise ions, radicals, atoms, and/or other high energy reactive species formed from the source gas. In some embodiments, the source gases may be flowed continuously into the plasma etch chamber during the plasma exposure block 1003.

The source gas may comprise one or a plurality of gases. In some embodiments, the source gas may comprise an inert gas, such as He, Ne, Ar, Kr, or Xe, and one or more of the following for forming a chemically reactive species: $O_2$, $N_2$, $H_2$, and halide gases, such as $XeF_2$, $C_2F_6$, $CF_4$, $CHF_3$, $CF_3Cl$, $SF_6$, $Cl_2$, BCL, and HBr. In some embodiments, the source gas may be flowed into the plasma etch chamber and may contact the high refractive index glass substrate before a plasma is ignited or generated in the plasma etch chamber.

As examples, the source gas may comprise $SF_6$ and Ar. In some other examples, the source gas may comprise $CHF_3$ and Ar. In yet other examples, the source gas may comprise $CHF_3$, $CF_4$, and Ar. Other examples of source gas compositions may comprise $BCl_3$ and HBr. In other examples, the source gas may comprise $BCl_3$, HBr, and Ar. In some embodiments, the source gas may comprise Ar and at least one other halide gas.

In some embodiments, exposing the substrate to a plasma may comprise exposing the substrate to a plasma-excited species generated from a noble gas, such as He, Ne, Ar, Kr, or Xe. For example, the plasma-excited species may be in the form of radicals, ions, plasma, or may be in elemental form. In some embodiments, the plasma may comprise $SF_6$ radicals, $SF_6$ molecules, and/or $SF_6$ plasma. In some embodiments, the plasma may comprise HBr radicals, HBr molecules, and/or HBr plasma. In some embodiments, the plasma may comprise $BCl_3$ radicals, $BCl_3$ molecules, and/or $BCl_3$ plasma. In some embodiments, the plasma may comprise $CHF_3$ radicals, $CHF_3$ molecules, and/or $CHF_3$ plasma. In some other embodiments, the plasma may comprise $CF_4$ radicals, $CF_4$ molecules, and/or $CF_4$ plasma.

In some embodiments, the total flow rate for the source gas into the plasma etch chamber may be in the range from less than about 1 sccm to about 100 sccm, or from about 25 sccm to about 75 sccm. In some embodiments, a flow rate for any one component gas of the source gas may be in the range from about 1 sccm to about 100 sccm. As an example, where the source gas comprises $SF_6$ and Ar, a flow rate for $SF_6$ may in the range from about 1 sccm to 100 about 100 sccm, preferably about 50 sccm, and a flow rate for Ar may be in the range from about 1 sccm to about 100 sccm, preferably about 50 sccm.

The surface of the high refractive index glass substrate and mask layer are exposed to a plasma in a reaction chamber at block 1003 until a desired amount of high refractive index glass has been removed from the portion or portions of the high refractive index glass substrate that are left exposed by the patterned mask layer. The removal of material transfers the pattern or structure form the mask layer into the high refractive index glass substrate. The duration for which the high refractive index glass substrate and mask layer are exposed to the plasma at block 1003 may be readily determined by the skilled artisan depending on the desired amount of material to be removed from the high refractive index glass substrate. For example, the high refractive index glass substrate and mask layer may be exposed to a plasma for a duration in the range of from less than 1 second to about 1 minute, or from about 5 seconds to about 30 seconds. In some embodiments, plasma exposure times of greater than about 1 minute may be used depending on the desired amount of high refractive index glass material to be removed and the thickness and composition of the mask layer.

In some embodiments, mask layer material may be removed by the plasma. Therefore, in some embodiments, the plasma exposure duration may be limited by the thickness of the mask layer and/or mask layer material. For example, the plasma exposure duration may be sufficiently short that holes extending the thickness of the mask layer are not formed.

Without wishing to be bound by theory, as discussed herein, a plasma according to some embodiments may remove material from the high refractive index glass substrate by both a physical etching mechanism and a chemical etching mechanism. In some embodiments, the source gas may comprise a gas which may etch a substrate by a physical mechanism when a plasma is generated therein, such as Ar, He, or $N_2$, and a gas which may etch a substrate by a chemical mechanism when a plasm is generated therein, such as $CF_4$, $CHF_3$, $SF_6$, $O_2$, $Cl_2$, $BCl_3$, HBr, and/or other halide gases.

The plasma may be generated by applying RF power to the source gas. The RF power may be applied to the source gas that flows during the plasma exposure block 1003, and/or that flows through a remote plasma generator. In some embodiments, the RF power applied to the source gas is in the range from about 10 W to about 500 W, from about 100 W to about 200 W, from about 200 W to about 500 W, or from about 10 W to about 100 W.

In some embodiments, where a plasma is generated in an ICP reactor, a first ICP power may be applied to the source gas to generate a plasma and a second RF power may be applied to the source gas and/or plasma in the reaction chamber to generate a directional electric field therein to, e.g., facilitate anisotropic etching by directing etchant species to the substrate in a straight line. In some embodiments, the ICP power may be in a range from about 10 W to about 2500 W. In some embodiments, the RF power may be in a range from about 10 W to about 500 W, from about 100 W to about 200 W, from about 200 W to about 500 W, or from about 10 W to about 100 W.

In some embodiments, for example where a dual frequency ICP reaction is used to generate a plasma, a first VHF power is applied to the source gas and a second RF power is applied to the source gas and/or plasma in the reaction chamber to generate a directional electric field therein. In some embodiments, the VHF power applied to the source gas may be in a range from about 10 W to about 2500 W. In some embodiments, the RF power may be in a range from about 10 W to about 500 W, from about 100 W to about 200 W, from about 200 W to about 500 W, or from about 10 W to about 100 W.

According to some embodiments a plasma may be generated with the plasma etch chamber having a pressure of from about 1 Torr to about 0.1 mTorr. More particularly, the reaction chamber pressure may be in a range from about 5 mTorr to about 20 mTorr, or from about 20 mTorr to about 100 mTorr in some embodiments. Without being bound by theory, it is believed that a relatively low reaction chamber pressure as compared with other typical plasma etching processes may reduce the tendency of any chemical etching mechanism to isotropically etch portions of the substrate. In some embodiments, a relatively low pressure, from example, a reaction chamber pressure from about 20 mTorr to about 100 mTorr may facilitate the formation of features having substantially vertical sidewalls.

In some embodiments, a plasma may be generated at a temperature of in a range from about −150° C. to about 50° C. In some embodiments, a plasma may be generated at a temperature in a range from about −120° C. to about −100° C., from about −100° C. to about 0° C., from about 0° C. to about 20° C., and from about 20° C. to about 50° C.

Figure 11A:
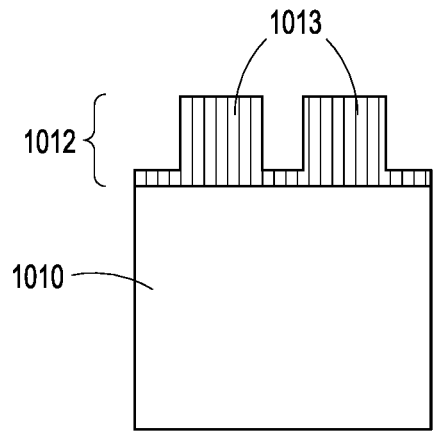
FIG. 11A illustrates a cross-sectional side view of an example of a glass substrate having an overlying etch mask.
Figure 11B:
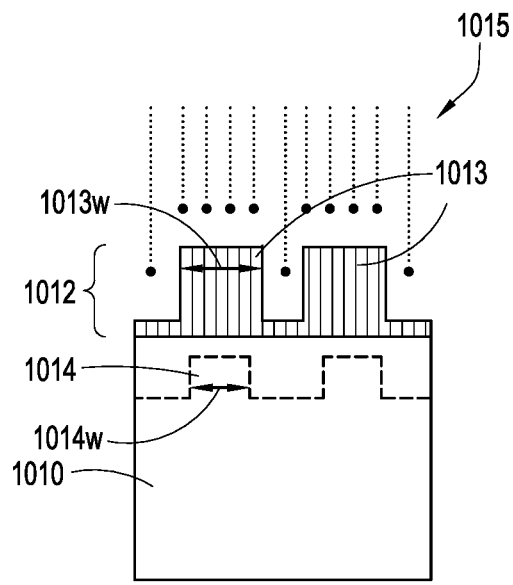
FIG. 11B illustrates a cross-sectional side view of an example of the structure of FIG. 11A undergoing a directional etch.
Figure 11C:
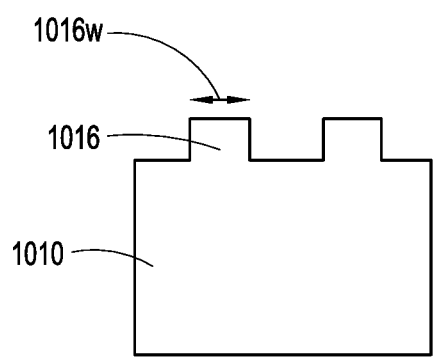
FIG. 11C illustrates a cross-sectional side view of an example of the structure of FIG. 11B after etching the glass substrate and removing the overlying etch mask.

With reference now to FIGS. 11A-11C, in some embodiments, an etch mask may be biased to facilitate the formation of features of desired sizes in a high refractive index glass substrate. Advantageously, the etch mask may be utilized in the patterning of underlying glass substrates using conventional directional etches, e.g., ion beam milling, and/or the plasma etching processes disclosed herein.

FIG. 11A illustrates a cross-sectional side view of an example of a glass substrate 1010 having an overlying etch mask 1012. The glass substrate 1010 may be formed of any of the high refractive index glass materials disclosed herein. For example, the material forming the glass substrate may have a refractive index of about 1.65 or more or 1.75 or more, and less than about 50 wt % $SiO_2$. In some embodiments, more than 50 wt % of the substrate is formed of one or more of $B_2O_3$, $Al_2O_3$, $ZrO_2$, $Li_2O$, $Na_2O$, $K_2O$, MgO, CaO, SrO, BaO, ZnO, $La_2O_3$, $Nb_2O_5$, $TiO_2$, HfO, and $Sb_2O_3$.

With continued reference to FIG. 11A, the etch mask 1012 may be formed of a polymer (e.g., a carbon-based polymer), chromium, silicon oxide ($SiO_2$), or other material having sufficient stability and etch resistance for patterning the substrate 1010. In some embodiments, the polymer may form a resist, e.g., a photoresist or imprint resist. In some embodiments, the resist may be deposited by jet deposition. As illustrated, the etch mask comprises a pattern formed of a plurality of spaced-apart features 1013, which will be used to protect parts of the underlying substrate 1010 from an etch, to define features in that substrate 1010.

In some embodiments where the resist is a photoresist, the etch mask 1012 may be patterned by exposure to light through a reticle. In some embodiments where the resist is an imprint resist, the etch mask 1012 may be patterned by contact and imprinting with an imprint reticle. In some other embodiments, the etch mask 1012 may itself be etched to define the pattern of features in the etch mask. For example, a resist (not shown) may be provided over a layer of material (e.g., chromium, silicon oxide, etc.) for forming the etch mask 1012. The resist may be patterned, e.g., by photolithography or imprinting, and then the pattern in the resist may be transferred to a layer of material for forming the etch mask 1012, and the overlying resist may be removed, thereby leaving the etch mask 1012.

With reference now to FIG. 11B, a cross-sectional side view of an example of the structure of FIG. 11A undergoing a directional etch as illustrated. As illustrated, the etch mask 1012 may have a plurality of features 1013, with the features having a critical dimension of 1013$w$. It will be appreciated that the critical dimension 1013$w$ may be the widths of the features 1013, which may be elongated along a length axis out of the page. Preferably, the critical dimension 1013$w$ is larger than the critical dimension 1014$w$ of the corresponding feature 1014 to be etched in the underlying substrate 1010 using the etch mask features 1013. In some embodiments, the critical dimension 1013$w$ may be selected by identifying desired dimensional characteristics of first features (e.g., features 1016 (FIG. 11C)) to be formed in a high-index glass substrate 1010; identifying etching characteristics of an etching process 1015 that is to be used for forming at least the first features in the high-index glass substrate; and determining, based on the identified etching characteristics, biasing dimensional characteristics of second features (e.g., features 1013) of a patterned layer (e.g., etch mask 1012) to be formed on the high-index glass substrate. For example, the critical dimension 1013$w$ may be biased to be sufficiently larger than the critical dimension 1014$w$ to compensate for etching of the etch mask 1012 by the particular etch chosen for etching the substrate 1010. Preferably, the sizes of the features 1013 are sufficiently large that, even when etched by the etch process 1015, the mask features 1013 are of a size to form openings of a desired size in the high-index glass substrate 1010. In addition, the heights of the features 1013 are preferably also biased to compensate for the removal of material at the tops of the features 1013 by the etch.

As illustrated, the substrate 1010 may be etched by exposing the substrate to a directional etch through openings in the etch mask 1012. It will be appreciated that, in embodiments where the etch mask 1012 does not have openings but has regions of lower thickness than the features 1013, the regions of lower thickness will be removed by the etch, to subsequently leave openings that expose portions of the substrate 1010 to the etch. The directional etch 1015 may include various particles that contact the substrate 1010 to remove material from that substrate. In some embodiments, the directional etch comprises ion beam milling. Advantageously, in some embodiments, the directional etch can form an opening having a depth of about 50 nm or more in about 20 seconds or less. In some embodiments, the directional etch can form the opening having the depth of about 50 nm or more in about 10 seconds or less.

FIG. 11C illustrates a cross-sectional side view of an example of the structure of FIG. 11B after etching the glass substrate 1010 and removing the overlying etch mask 1012 (FIGS. 11A-11B). In some embodiments, the etch mask 1012 may be removed using an ashing process and/or a wet etch selected for the material forming the etch mask. The etched substrate 1010 includes a plurality of features 1016 defined by the etch 1015. The features have critical dimensions of 1016$w$ which may be substantially equal to the desired critical dimensions 1014$w$ (FIG. 11B).

As discussed herein, in some embodiments, the substrate 1010 may be utilized as a waveguide and the features 1016 may be optical elements defined in the surface of the waveguide. For example, the features 1016 may form parts of the incoupling optical elements 1212, 1222, 1232, the light distributing elements 1214, 1224, 1234, and/or the outcoupling optical element 1250, 1252, 1254 of FIGS. 9A-9C.

As noted above regarding FIGS. 11A-11B, the features 1013 may be biased to have sizes larger than the desired sizes of the features 1016 ultimately patterned by the features 1013. This larger size may be set by patterning the layer forming the etch mask 1012 and providing a layer having the desired thickness for the etch mask 1012. In some other embodiments, the features in the etch mask may be augmented to increase their size. FIGS. 12A-12D illustrate a process for etching features in the substrate using an augmented etch mask.

Figure 12A:
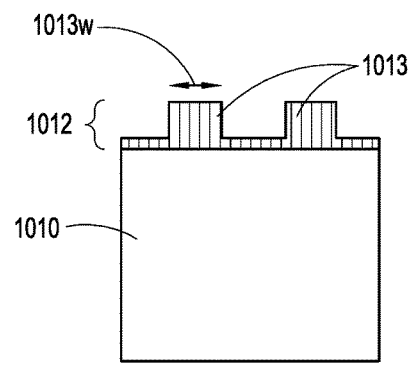
FIG. 12A illustrates a cross-sectional side view of another example of an etch mask overlying a glass substrate.

With reference now to FIG. 12A, a cross-sectional side view is illustrated of an example of an etch mask 1012 overlying a high-refractive index glass substrate 1010. The etch mask 1012 comprises features 1013 having critical dimension 1013$w$. It will be appreciated that the structure shown in FIG. 12A is similar to that shown in FIG. 11A, except for the critical dimension 1013$w$, which may be smaller than that of FIG. 11A.

Figure 12B:
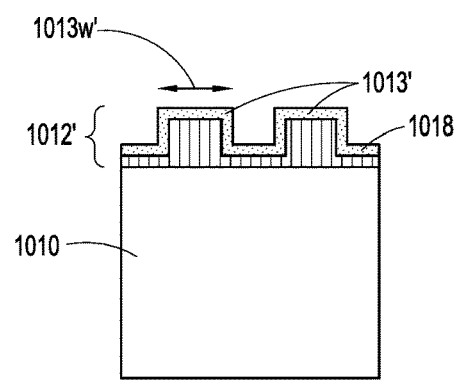
FIG. 12B illustrates a cross-sectional side view of an example of the structure of FIG. 12A after expanding the sizes of features of the etch mask.

The etch mask 1012 of FIG. 12A may be considered an initial etch mask and the dimensions of the features 1013 of that etch mask may subsequently be increased. FIG. 12B illustrates a cross-sectional side view of an example of the structure of FIG. 12A after expanding the sizes of features 1013 of the etch mask 1012. In some embodiments, the size expansion may be achieved by depositing a conformal layer 1018 over the etch mask 1012, thereby forming etch mask 1012' having features 1013' with critical dimensions 1013$w$'. For example, the conformal layer 1018 may be a silicon oxide layer deposited by a vapor deposition process such as atomic layer deposition (ALD) or chemical vapor deposition (CVD). In some other embodiments, the sizes of features 1013 (FIG. 12A) in the etch mask 1012 may be expanded by chemically reacting the etch mask to form materials occupying larger volume. For example, the etch mask 1012 may be oxidized to, e.g, form the layer 1018, thereby forming the etch mask 1012' with the expanded features 1013'. In some embodiments, the chemical reaction may occur to such an extent that the layer 1018 may extend through substantially the entirety of the etch mask 1012'.

Figure 12C:
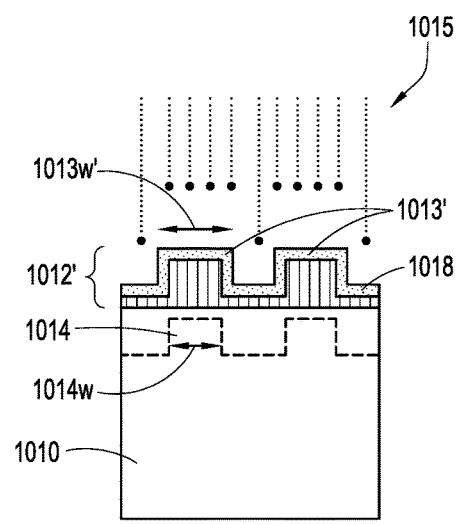
FIG. 12C illustrates a cross-sectional side view of an example of the structure of FIG. 12B undergoing a directional etch.

With reference now to FIG. 12C, a cross-sectional side view is illustrated of an example of the structure of FIG. 12B undergoing directional etch 1015. It will be appreciated that FIG. 12C is similar to FIG. 12B, except that the etch mask comprises the layer 1018 and the directional etch 1015 is preferably selective for the material of the layer 1018 relative to the substrate 1010. The etch mask 1012' comprises a plurality of features 1013', with the features having a critical dimension of 1013$w$', which is larger than the critical dimension 1014$w$ of the corresponding feature 1014 to be etched in the underlying substrate 1010 using the etch mask 1012'. As discussed herein, in some embodiments, the directional etch comprises ion beam milling. Advantageously, in some embodiments, the directional etch can form an opening having a depth of about 50 nm or more in about 20 seconds or less, or in about 10 seconds or less.

Figure 12D:
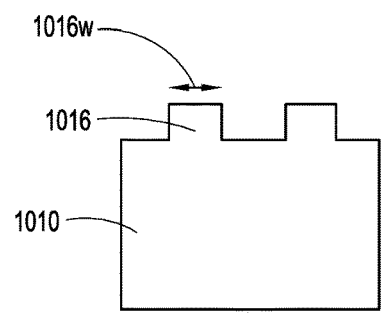
FIG. 12D illustrates a cross-sectional side view of an example of the structure of FIG. 12B after etching the glass substrate and removing the overlying etch mask.

FIG. 12D illustrates a cross-sectional side view of an example of the structure of FIG. 12B after etching the glass substrate 1010 and removing the overlying etch mask 1012' (FIG. 12C). It will be appreciated that FIG. 12D is similar to FIG. 11C. For example, the etch mask 1012 may be removed using an ashing process and/or a wet etch selective for the material forming the etch mask. The etched substrate 1010 includes a plurality of features 1016 defined by the etch 1015 and having critical dimensions of 1016$w$ which may be substantially equal to the desired critical dimensions 1014$w$ (FIG. 11B).

In the foregoing specification, various specific embodiments have been described. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A method for forming one or more diffractive gratings in a waveguide, the method comprising:
   providing a waveguide having a refractive index of greater than or equal to about 1.65, wherein more than 50 wt % of the waveguide is formed of one or more of $B_2O_3$, $Al_2O_3$, $ZrO_2$, $Li_2O$, $Na_2O$, $K_2O$, MgO, CaO, SrO, BaO, ZnO, $La_2O_3$, $Nb_2O_5$, $TiO_2$, HfO, and $Sb_2O_3$;
   providing a mask layer over the waveguide, the mask layer having a pattern corresponding to the one or more diffractive gratings, the pattern selectively exposing portions of the waveguide; and
   anisotropically etching the exposed portions of the waveguide to define the one or more diffractive gratings in the waveguide.

2. The method of claim 1, wherein providing a mask layer comprises providing the pattern comprising a first diffraction grating pattern over a first region and a second diffraction grating pattern in the second region of the waveguide, wherein the second region extends over a majority of an area of a surface of the waveguide.

3. The method of claim 2, wherein the first diffraction grating pattern corresponds to an incoupling optical element and the second diffraction grating pattern corresponds to an outcoupling optical element.

4. The method of claim 3, wherein providing a mask layer comprises providing the pattern comprising a third diffraction grating pattern over a third region of the waveguide, wherein the third diffraction grating pattern corresponds to an orthogonal pupil expander configured to redirect light from the incoupling optical element to a top coupling optical element.

5. The method of claim 1, wherein each of the one or more diffractive gratings comprise substantially parallel lines, wherein each line has a critical dimension of less than about 1 micron and an aspect ratio of between about 1:10 to about 10:1.

6. The method of claim 5, wherein each line has a critical dimension of less than about 300 nm.

7. The method of claim 5, wherein the mask layer comprises an underlying mask layer and an overlying conformal layer of mask layer material.

8. A plasma etching process for forming features in a high refractive index glass substrate, the process comprising:
   providing a patterned mask layer on at least a portion of the high refractive index glass substrate, the substrate formed of glass having a refractive index of greater than or equal to about 1.65 and comprising less than about 50 wt % $SiO_2$, and
   etching the features in the substrate by exposing the mask layer and high refractive index glass substrate to a plasma etch comprising chemical and physical etchant species to selectively remove exposed high refractive index glass from the high refractive index glass substrate.

9. The plasma etching process of claim 8, wherein the high refractive index glass substrate comprises less than about 30 wt % $SiO_2$.

10. The plasma etching process of claim 8, wherein more than 50 wt % of the high refractive index glass substrate is formed of one or more of $B_2O_3$, $Al_2O_3$, $ZrO_2$, $Li_2O$, $Na_2O$, $K_2O$, MgO, CaO, SrO, BaO, ZnO, $La_2O_3$, $Nb_2O_5$, $TiO_2$, HfO, and $Sb_2O_3$.

11. The plasma etching process of claim 8, wherein the high refractive index glass substrate has a refractive index of greater than or equal to about 1.70.

12. The plasma etching process of claim 8, wherein exposing the mask layer and high refractive index glass substrate to a plasma etch comprises anisotropically removing high refractive index glass from an exposed surface of the high refractive index glass substrate.

13. The plasma etching process of claim 8, wherein the plasma is produced from a source gas and wherein the plasma is generated in situ in a reaction chamber accommodating the high refractive index glass substrate.

14. The plasma etching process of claim 13, wherein the source gas comprises $SF_6$ and Ar gas.

15. The plasma etching process of claim 13, wherein the source gas comprises $BCl_3$, HBr, and Ar gas.

16. The plasma etching process of claim 13, wherein the source gas comprises $CF_4$, $CHF_3$, and Ar gas.

17. The plasma etching process of claim 8, wherein the plasma etching process takes place within a reaction chamber of an inductively coupled plasma (ICP) reactor.

18. The plasm etching process of claim 17, wherein the ICP reactor is a dual frequency ICP reactor.

19. The plasma etching process of claim 8, wherein each of the features has a critical dimension of less than about 100 nm.

20. The plasma etching process of claim 19, wherein each of the features has an aspect ratio of between about 1:10 to about 10:1.

21. The plasma etching process of claim 19, wherein the features are sized and spaced to form a diffractive grating.

22. The plasma etching process of claim 8, wherein the mask layer comprises a polymeric resist layer.

23. The plasma etching process of claim 8, further comprising removing remaining mask layer from the high refractive index glass substrate after exposing the mask layer and high refractive index glass substrate to the plasma.

24. A process for forming features in a high refractive index glass substrate, the process comprising:
  selectively exposing a portion of the high refractive index glass substrate to a plasma in a reaction chamber to selectively remove high refractive index glass from the high refractive index glass substrate;
  wherein the high refractive index glass substrate comprises less than about 50 wt % $SiO_2$ and has a refractive index of greater than or equal to about 1.65.

25. The process of claim 24, wherein the high refractive index glass substrate comprises one or more of $B_2O_3$, $Al_2O_3$, $ZrO_2$, $Li_2O$, $Na_2O$, $K_2O$, MgO, CaO, SrO, BaO, ZnO, $La_2O_3$, $Nb_2O_5$, $TiO_2$, HfO, and $Sb_2O_3$.

26. The process of claim 24, wherein selectively exposing a portion of the high refractive index glass substrate defines a pattern of protrusions in the substrate, wherein the protrusions form an optical diffraction grating.

27. The process of claim 26, further comprising
  depositing a mask layer on the substrate;
  patterning the mask layer to define a first set of spaced apart lines in a first region over the substrate, and a second set of spaced part lines in a second region over the substrate,
  wherein selectively exposing a portion of the high refractive index glass substrate comprises etching the substrate through the mask layer to form:
    a light incoupling diffractive grating in an area of the substrate corresponding to the first region, and
    a light outcoupling diffractive grating in an area of the substrate corresponding to the second region.

28. The process of claim 27, wherein patterning the mask layer further defines a third set of spaced apart lines in a third region over the substrate, and
  wherein selectively exposing a portion of the high refractive index glass substrate comprises etching the substrate through the mask layer to form an orthogonal pupil expander corresponding to the third region.

* * * * *